US009579801B2

(12) United States Patent
Wettels

(10) Patent No.: US 9,579,801 B2
(45) Date of Patent: Feb. 28, 2017

(54) SYSTEMS AND METHODS FOR SENSING OBJECTS

(71) Applicant: Somatis Sensor Solutions LLC, Los Angeles, CA (US)

(72) Inventor: Nicholas Wettels, Los Angeles, CA (US)

(73) Assignee: Somatis Sensor Solutions LLC, Los Angeles, CA (US)

(*) Notice: Subject to any disclaimer, the term of this patent is extended or adjusted under 35 U.S.C. 154(b) by 137 days.

(21) Appl. No.: 14/302,273

(22) Filed: Jun. 11, 2014

(65) Prior Publication Data
US 2014/0365009 A1 Dec. 11, 2014

Related U.S. Application Data

(60) Provisional application No. 61/833,457, filed on Jun. 11, 2013, provisional application No. 61/950,761, filed on Mar. 10, 2014.

(51) Int. Cl.
*G01L 1/16* (2006.01)
*B25J 13/08* (2006.01)
(Continued)

(52) U.S. Cl.
CPC .......... *B25J 13/086* (2013.01); *B25J 9/1612* (2013.01); *B25J 13/082* (2013.01); *B25J 15/00* (2013.01);
(Continued)

(58) Field of Classification Search
CPC ... G01L 9/02; G01L 1/16; G01L 5/226; A61B 5/053; B25J 9/16
(Continued)

(56) References Cited

U.S. PATENT DOCUMENTS 4,475,008 A 10/1984 Doi et al.
5,175,214 A 12/1992 Takaya et al.
(Continued)

FOREIGN PATENT DOCUMENTS

JP 2010/010116 A 1/2010

OTHER PUBLICATIONS

International search report and written opinion dated Oct. 16, 2014 for PCT/US2014/041986.

*Primary Examiner* — Lisa Caputo
*Assistant Examiner* — Octavia Hollington
(74) *Attorney, Agent, or Firm* — Wilson Sonsini Goodrich & Rosati

(57) ABSTRACT

Disclosed is a tactile sensing and integrated vision system that surmounts problems of existing systems. The tactile sensing skin can be formed into any shape, size, or form factor, including large areas. Computer-implemented algorithms can detect position-orientation and force-torque at landmark points for a given object set. The result is a modular sensing system that is highly scalable in terms of price, quantity, size and applications. Such skin technology and associated software can comprise a sensing package that integrates tactile and visual data with accompanying software for state estimation, situational awareness, and automatic control of machinery. The addition of tactile data can serve to constrain and/or augment visual pose estimation methods as well as provide pose estimation to visually occluded objects.

39 Claims, 24 Drawing Sheets

(51) Int. Cl.
 *B25J 9/16* (2006.01)
 *G01L 5/22* (2006.01)
 *B25J 15/00* (2006.01)

(52) U.S. Cl.
 CPC .... *G01L 5/226* (2013.01); *G05B 2219/37002* (2013.01); *G05B 2219/39528* (2013.01)

(58) Field of Classification Search
 USPC .................................................... 73/862.68
 See application file for complete search history.

(56) References Cited

U.S. PATENT DOCUMENTS

| | | | | |
|---|---|---|---|---|
| 6,501,984 B1 * | 12/2002 | Church | ............... | A61B 5/0536 600/547 |
| 7,658,119 B2 * | 2/2010 | Loeb | .................... | B25J 13/084 73/862.046 |
| 8,750,978 B2 * | 6/2014 | Campbell | .............. | A61B 5/053 600/547 |
| 8,963,562 B2 * | 2/2015 | Basu | ............................ | 324/654 |
| 2009/0259412 A1 | 10/2009 | Brogardh | | |
| 2010/0280661 A1 | 11/2010 | Abdallah et al. | | |
| 2011/0067504 A1 | 3/2011 | Koyama et al. | | |
| 2011/0193363 A1 | 8/2011 | Nishiwaki | | |
| 2013/0116532 A1 * | 5/2013 | Brunner | ............... | A61B 5/0536 600/390 |

* cited by examiner

SYSTEMS AND METHODS FOR SENSING OBJECTS

CROSS-REFERENCE

This application claims the benefit of U.S. Provisional Patent Application No. 61/833,457, filed Jun. 11, 2013, and U.S. Provisional Patent Application No. 61/950,761, filed Mar. 10, 2014, each of which is entirely incorporated herein by reference.

BACKGROUND

The field of robotics deals with the design, construction, operation, and application of robots, as well as computer systems for their control, sensory feedback, and information processing. These technologies deal with automated machines that can take the place of humans in dangerous environments or manufacturing processes, or resemble humans in appearance, behavior, and/or cognition.

There has been some effort to create machines that assist or extend human capability. The field of robotics has developed many technologies and methods for sensing and manipulating external objects. This has proven useful in many areas, including augmenting or replacing humans doing dangerous, difficult, precise, or repetitive tasks. There is currently technology from robotics, computer vision, high energy-density battery systems, small robust high-performance computation, sophisticated wireless communication links, micro sensors for pressure, magnetism, orientation and acceleration, and widely available communication devices with displays and multiple sensors for input.

Tactile, touch and pressure sensing are human sensory features that are difficult to accurately and effectively emulate in machinery. Tactile sensing can be incorporated into feedback loops for robotic manipulators and actuators and integrated with other sensors to provide situational awareness and the ability to monitor, identify, grasp, and manipulate physical objects. For example data from vision, acceleration and tactile sensors can be fused in real-time to guide a robotic arm in grasping and moving delicate parts. However, tactile sensing approaches currently available to not provide the requisite level of sensing performance to enable at least the aforementioned applications.

A number of approaches to these sensing and data fusion challenges have been tried. The potential utility of current approaches can be considered from the perspective of their fundamental properties and implications for sensitivity, dynamic range and robustness. Presently, no commercial vendors claim robustness of their sensor packages across different environments. In some cases, operating temperature range is usually the sole robustness feature of these products.

SUMMARY

Recognized herein are various drawbacks and limitations associated with current robotics and sensing systems. For example, present sensing systems may not provide a sensing resolution that is sufficient to sense and manipulate objects in various settings, such as consumer and industrial applications. As another example, present sensing systems may not be capable of being readily integrated into systems for use in various settings, such as industrial applications. Clearly, advances in tactile sensing are critically needed in order to improve robotic ability to identify and manipulate objects and better interact with humans and unstructured environments.

The present disclosure provides sensing materials, devices, systems and methods. Some embodiments provide conformal elastomeric materials. Devices and systems of the present disclosure can be used in automatic machine sensing and manipulation of physical objects.

Disclosed herein is an inexpensive tactile sensing and integrated vision system that can surmount problems of existing systems. This touch sensor and vision system can yield lower purchase cost and is easily calibrated for shorter set-up times for new production runs compared to existing vision based systems.

In an aspect, the present disclosure provides a conductive skin formed of a polymeric material (e.g., rubber) that can be doped with a chemically inert material, such as a carbon-containing material. In some examples, the carbon-containing material is carbon (e.g., carbon powder) and/or carbon nanostructures. The polymeric material can include an elastomer. The inert material may not interfere with the elastomer curing process. Upon curing, the polymeric material can yield a skin that can be flexible. The skin can be fabricated in any form factor. The skin can be wrapped around a housing and, in some cases, fastened with a non-conductive material (e.g., plastic zipper). The skin can include an array of electrodes for sensing, such as, for example, an array of at least 3, 4, 5, 6, 7, 8, 9, 10, 11, 12, 13, 14, 15, 16, 17, 18, 19, 20, 30, 40, 50, or 100 electrodes. The electrodes can function as boundary-based tomographic units.

The tactile sensing skin can be formed into any shape, size, or form factor, including large areas. Algorithms detect position-orientation and force-torque at landmark points for a given object set. The result is a modular sensing system that is highly scalable in terms of price, quantity, size, and applications. The skin technology and associated software of the present disclosure can comprise a sensing package that integrates tactile and visual data with accompanying software for state estimation, situational awareness, and automatic control of machinery.

In some embodiments, a sensing system comprises an advanced multi-modal "fingerpad" suite of sensors that can sense tri-axial forces and torques and position and orientation of depressed objects, as well as a robust, inexpensive robotic "skin" able to discern normal pressure distributions that is easy to shape to any form factor over large areas.

In some embodiments, a sensing system comprises a tactile component for pose and force estimation. The system can comprise a conductive material that detects contact events, as well as static changes in resistivity to compressive and tensile stresses. The conductive material can be an elastomeric skin with electrodes at the periphery to yield an easily replaceable part with tailorable mechanical properties with no wires or electronics in the workspace. The elastomeric skin can be formed of a polymeric material, such as polysiloxane (silicone rubber), polyurethane or other elastomeric compounds. The skin can further include foam and carbon black.

In some examples, a sensing device can include embedded integrated rubber electrodes. The sensing device can include a skin that includes doping and foaming agents to create a material with simultaneously variable mechanical, thermal and electrical properties.

The sensing system can further include an optical device that can collect vision information. The optical device can be a motion sensing system, which can detect the spatial orientation or disposition of an object in two or three dimensions.

The sensing system can further include a computer processor that is programmed or otherwise configured to generate an initial estimate of pose based on vision data and further refine the initial estimate when tactile data is introduced. Each measurement (both vision and tactile) can contain a set of position vectors and surface normal vectors (6D), or data points. The measurement can be a point cloud with each point having a corresponding surface normal vector direction. For each data point, the computer processor can calculate a closest point on a known model, and subsequently calculate the pose difference for the data point.

An aspect of the present disclosure provides a system for manipulating and/or sensing the presence of an object, comprising at least one polymeric substrate including a plurality of non-metallic sensing electrodes, wherein the non-metallic sensing electrodes are flexible, and wherein the non-metallic sensing electrodes are adapted to sense changes in electrical impedance when disposed at or in proximity to the object. The system further comprises a computer processor electrically coupled to the plurality of sensing electrodes and programmed to (i) measure signals indicative of a change in impedance of at least a subset of the non-metallic sensing electrodes, (ii) execute an electrical impedance tomography algorithm to determine, from the signals, one or more forces applied to the polymeric substrate, and (iii) based on the one or more forces, determine one or more characteristics of the object. In an embodiment, the one or more characteristics are selected from the group consisting of presence of the object, shape of the object, and proximity of the object to the polymeric substrate. In another embodiment, the system further comprises a manipulation member disposed adjacent to the polymeric substrate, wherein the manipulation member is configured to manipulate the object. In another embodiment, the polymeric substrate is wrapped around the manipulation member. In another embodiment, the manipulation member is a robotic gripper. In another embodiment, the manipulation member is configured to apply a magnetic field to grip or grasp the object. In another embodiment, the manipulation member is configured to apply an electrical current through the object to determine one or more properties of the object.

In an embodiment, the polymeric substrate comprises a polymeric material and a fabric. In another embodiment, the polymeric substrate comprises a first component volume and a second component volume, wherein the first component volume comprises the plurality of non-metallic sensing electrodes and the second component volume comprises a plurality of conductive pathways that are each in electrical contact with a non-metallic sensing electrode among the plurality of non-metallic sensing electrodes. In another embodiment, the conductive pathways through the second component volume are metallic wires. In another embodiment, the conductive pathways through the second component volume are a plurality of tunnels, wherein each tunnel is filled with a polymeric material.

In an embodiment, each of the plurality of non-metallic sensing electrodes comprises a pair of conductive pathways. In another embodiment, the computer processor is programmed to apply an excitation voltage to the pair of conductive pathways. In another embodiment, the computer processor is programmed to measure a voltage across the conductive pathways subsequent to applying the excitation voltage.

In an embodiment, the polymeric substrate has a hemispherical, cylindrical or box-like shape. In another embodiment, the non-metallic sensing electrodes are formed of a polymeric material. In another embodiment, the polymeric material has a higher electrical conductivity than the polymeric substrate. In another embodiment, the non-metallic sensing electrodes comprise a carbon-containing material. In another embodiment, the carbon-containing material is selected from the group consisting of carbon powder or carbon nanostructures. In another embodiment, the non-metallic sensing electrodes comprise a foaming agent.

Another aspect of the present disclosure provides a paper production system comprising any of the systems above or elsewhere herein.

Another aspect of the present disclosure provides a method for manipulating and/or sensing the presence of an object, comprising providing a sensing system comprising at least one polymeric substrate, wherein the polymeric substrate comprises a plurality of non-metallic sensing electrodes that are flexible, and wherein the non-metallic sensing electrodes are adapted to sense changes in electrical impedance when disposed at or in proximity to the object. Next, signals indicative of a change in impedance of at least a subset of the non-metallic sensing electrodes are measured. The signals are measured when the object is at or in proximity to the sensing system. Using a computer processor electrically coupled to the sensing system, an electrical impedance tomography algorithm is executed to determine, from the measured signals, one or more forces applied to the polymeric substrate. Based on the one or more determined forces, one or more characteristics of the object are determined.

In an embodiment, the one or more characteristics are selected from the group consisting of presence of the object, shape of the object, and proximity of the object to the polymeric substrate. In another embodiment, the method further comprises applying an excitation voltage to a subset of the non-metallic sensing electrodes. In another embodiment, the method further comprises measuring a voltage across the subset subsequent to applying the excitation voltage. In another embodiment, the method further comprises manipulating the object using a manipulation member, wherein the manipulation member is part of or electrically coupled to the sensing system. The object can be manipulated once the one or more characteristics of the object have been determined.

Another aspect of the present disclosure provides a method for sensing and/or manipulating an object, comprising providing a manipulation system comprising a manipulation member and a motion input sensing device, wherein the manipulation member comprises at least one sensor with sensing electrodes that measure changes in impedance when an object is situated at or in proximity to the sensing electrodes, and wherein the motion input sensing device determines the spatial configuration of the object. Next, the object is brought at or in proximity to the manipulation system. Using the motion input sensing device, a first set of data is collected from the object, wherein the first set of data is indicative of the spatial configuration of the object. Next, using the sensing electrodes of the sensor, a second set of data is collected under boundary conditions determined from the first set of data, wherein the second set of data is indicative of impedance changes. Next, using the manipulation member, the object is manipulated if, based on the impedance changes, the object is determined to be at or in proximity to the sensor.

In an embodiment, the boundary conditions are determined from one or boundaries of the object from the first set of data. In another embodiment, the first set of data has a lower spatial resolution than the first set of data. In another embodiment, the method further comprises determining one or more characteristics of the object from the first set of data. In another embodiment, the method further comprises refining the one or more characteristics of the object based on the second set of data. In another embodiment, the method further comprises, combining the first set of data and the second set of data. In another embodiment, the method further comprises, fitting the combined data to one or more predetermined objects having known characteristics. In another embodiment, the method further comprises determining a pose estimate subsequent to the fitting.

Another aspect of the present disclosure provides a computer readable medium comprising machine-executable code that, upon execution by one or more computer processors, implements any of the methods above or elsewhere herein.

Another aspect of the present disclosure provides a system comprising one or more computer processors and memory coupled thereto. The memory comprises machine-executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1A:
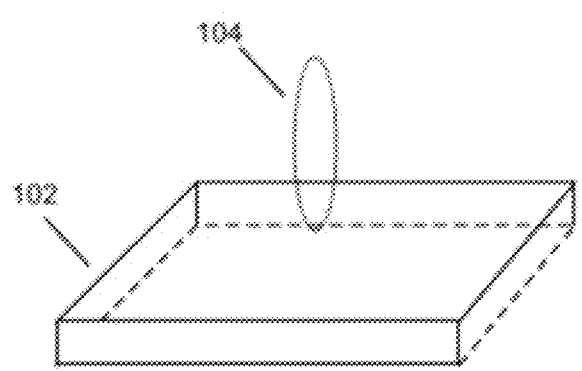
FIGS. 1A, 1B, 1C, and 1D are schematic depictions of physical arrangements of sensing systems.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "object," as used herein, generally refers to any three-dimensional tangible object. Examples of objects include, without limitation, parts, wood products (e.g., paper), electronics, components of electronics, and food products.

The term "impedance," as used herein, generally refers to electrical impedance, which is a measure of the opposition that a circuit presents to a current when a voltage is applied. The current can be alternating current (AC).

The detailed description which follows is presented in part in terms of algorithms and symbolic representations of operations on data bits within a computer memory representing alphanumeric characters or other information. These descriptions and representations may be used by those skilled in the art of data processing arts to effectively convey the substance of their work to others.

An algorithm can be a self-consistent sequence of operations leading to a desired or predetermined result, which can be implemented upon execution by one or more computer processors. These operations are those requiring physical manipulations of physical quantities. In some cases, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. Such terms may be associated with the appropriate physical quantities and are merely used here as convenient labels applied to these quantities.

Some algorithms may use data structures for the collection and storage of information and for producing the desired result. Data structures greatly facilitate data management by data processing systems, and are not accessible except through sophisticated software systems. Data structures are not the information content of a memory device, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Operations of the present disclosure can be machine operations, which can be implemented using or with the aid of a machine, including a computer control system. Useful machines for performing the operations of the present disclosure include, without limitation, general purpose digital computers or other similar devices. In all cases the distinction between the method operations in operating a computer and the method of computation itself should be recognized. The present disclosure provides devices, systems and methods that relate to the operation of a computer to process electrical or other (e.g., mechanical, chemical) physical signals to generate other physical signals. The present disclosure also provides devices, systems and methods that relate to an apparatus for performing these operations. This apparatus may be specifically constructed for the required or otherwise predetermined purposes or it may comprise a general purpose computer as selectively activated or reconfigured by a computer program stored in the computer. The apparatus may also comprise a "cluster," wherein multiple computers with an interconnecting data network are configured to act in concert for the required purpose. The algorithms presented herein are not inherently related to any particular computer or other apparatus. In particular, various general purpose machines may be used with programs written in accordance with the teachings herein, or it may prove more convenient to construct more specialized apparatus to perform the required method operations. The required structure for a variety of these machines will appear from the description below.

In the following description, several terms which are used frequently have specialized meanings in the present context. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations" or "clients," provide a user interface so that users of computer networks may access the network resources, such as shared data files, common peripheral devices, and inter-workstation communication. Users activate computer programs or network resources to create "processes" which include both the general operation of the computer program along with specific operating characteristics determined by input variables and its environment. Similar to a process is an agent (sometimes called an intelligent agent), which is a process that gathers information or performs some other service without user intervention and on some regular schedule. Typically, an agent, using parameters typically provided by the user, searches locations either on the host machine or at some other point on a network, gathers the information relevant to the purpose of the agent, and presents it to the user on a periodic basis.

The terms "windows" and associated terms such as "windowing environment" or "running in windows" defined above refer to a computer user interface, exemplified by the several windowing systems available from Microsoft Corporation of Redmond, Wash. Other windows computer interfaces are available, for example from Apple Computers Incorporated of Cupertino, Calif. and as components of the Linux operating environment. In particular it should be understood that the use of these terms in the descriptions herein does not imply a limitation to any particular computing environment or operating system.

The term "desktop," as used herein, generally refers to a user interface (UI) which presents a menu or display of objects with associated settings for the user associated with the desktop. A UI can be a graphical user interface (GUI) or a web-based user interface. When the desktop accesses a network resource, which can require an application program to execute on the remote server, the desktop can call an Application Program Interface ("API") to allow the user to provide commands to the network resource and observe any output.

The term "browser," as used herein, generally refers to a program which is not necessarily apparent to the user, but which is responsible for fetching and rendering information. Browsers are designed to utilize a communications protocol for retrieval of information, for example textual, graphical, and formatting information. This information is accessed using a network of computers, often the "World Wide Web" or simply the "Web". Examples of Browsers compatible with the present invention include the Internet Explorer program sold by Microsoft Corporation (Internet Explorer is a trademark of Microsoft Corporation), the Opera Browser program created by Opera Software ASA, or the Firefox browser program distributed by the Mozilla Foundation (Firefox is a registered trademark of the Mozilla Foundation). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non-visual codes in a text document through the use of text codes. Files in these formats may be easily transmitted across computer networks, including global information networks like the Internet, and allow the Browsers to display text, images, and play audio and video recordings. The Web utilizes these data file formats to conjunction with communication protocols to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

The term "personal digital assistant" ("PDA"), as used herein, generally refers to any handheld, mobile device that combines computing, telephone, fax, e-mail and networking features.

The term "wireless wide area network" ("WWAN"), as used herein, generally refers to a wireless network that serves as the medium for the transmission of data between a handheld device and a computer.

The term "synchronization," as used herein, generally refers to the exchange of information between a handheld device and a desktop computer either via wires or wirelessly. Synchronization ensures that the data on both the handheld device and the desktop computer are identical.

In wireless wide area networks, communication can primarily occur through the transmission of radio signals over analog, digital cellular, or personal communications service ("PCS") networks. Signals may also be transmitted through microwaves and using various techniques for modulating properties of electromagnetic waves. The electromagnetic waves used for communication may include "optical" waves at visual or near-visual frequencies, transmitted through free space or using "optical fibers" as a waveguide. At the present time, most wireless data communication takes place across cellular systems using technology such as code-division multiple access ("CDMA"), time division multiple access ("TDMA"), the Global System for Mobile Communications ("GSM"), personal digital cellular ("PDC"), or through packet-data technology over analog systems such as cellular digital packet data ("CDPD") used on the Advance Mobile Phone Service ("AMPS").

The term "real-time" (also "realtime" and "real time") or "near real-time" as used herein, generally refers to a system design approach that uses timing as a primary design objective. In particular, a real-time system completes one or more operations within a time interval that meets predetermined criteria. The term may also be used to refer to an operation performed, for example an "update in real-time." The time interval criteria may be a specific amount of time, or may be defined in contrast to another non-real-time system, sometimes referred to as "batch" or "offline" system.

The time interval criteria for a real-time system can be determined by requirements that vary among systems. For example, a high-performance aircraft real-time control system may be required to respond in microseconds, while for a real-time reservoir level regulator update intervals of hours may be acceptable. In interactions with a human user, a system providing "real-time response" generally refers to a user receives a response to an input quickly enough to allow interactive or "live" use of the system without annoying delay.

In real-time transaction processing, a system can be designed to rapidly complete an operation that affects system data. The resulting changed data can be made available to other system components as rapidly as possible, in some cases without requiring an offline synchronization process. The exact timing of such a system can be dependent on a number of factors, such as processing time and propagation of data across networks, but that the salient characteristic is rapid availability of data modified as a result of a transaction or event.

The term "elastomer" in the descriptions herein, refers to a material that changes properties in response to an applied force. Elastomers, in various formulations, respond to normal forces, compression, torque, or sheer stresses or forces. Some elastomers are also referred to as "rubber," "polymer," or "silicone." Typically, but not always, an elastomer responds to an applied force with a physical deformation. Additionally, elastomers can be designed to change various properties such as impedance in response to applied force, stress, or torque. Elastomers can be configured to change properties when stressed in one dimension, or in multiple dimensions.

Elastomers can be formulated and produced with various properties that may be desirable for a given application, for example desired flexibility, stiffness (i.e. spring constant or dimensional change in response to pressure), conformability (i.e. ability to follow a curved or complex contour), thickness, color, or electrical or heat conductivity. Another property of an elastomer is "durometer," which is its hardness or resistance to permanent deformation.

FIG. 1A is a schematic depiction of a physical arrangement of a sensor (or sensing assembly), in accordance with some embodiments. Sensitive elastomer 102 is in contact with object 104. Elastomer 102 can change properties (e.g., resistance or impedance) in response to the presence of object 104 and these changed properties are observed to provide data about object 104. For example, the position of object 104 relative to the edges of elastomer 102 is determined. The force applied by object 104 to elastomer can be determined and that force may be normal, sheer, torque, or a combination of these. Properties of elastomer 102 that change in response to contact of object 104 can be used to detect motion of object 104, including position, velocity, acceleration, and other derivatives. Although a single object 104 is shown, multiple objects contacting elastomer 102 can be detected simultaneously, separately or sequentially. In some cases, a continuous map of the pressure, force or impedance distribution on the surface of elastomer 102 can be determined.

Figure 1B:
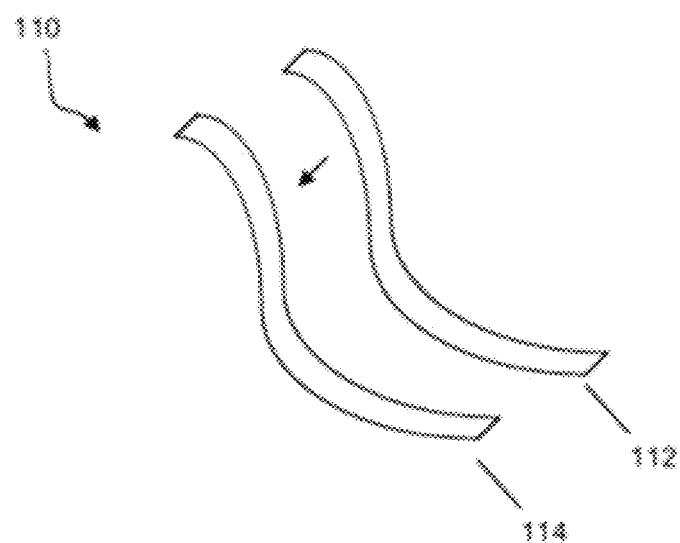

FIG. 1B is another schematic depiction of a physical arrangement of a sensor, in accordance with some embodiments. System 110 incorporates a sensing elastomer skin 112 mounted onto an arbitrary curved surface 114, illustrating an example where elastomer skin 112 is flexible and shaped to conform to a curved surface. Although a simple two-dimensional curve is shown, in various examples elastomer skin 112 can be formed into complex three-dimensional shapes to achieve 3-dimensional force and torque sensing. For example, skin 112 can be formed into a sensing fingertip or glove, or other surface. The skin 112 can be formed or applied onto a housing, such as a housing that is part of a system for manipulating an object.

In an example, the skin 112 is applied to a fingertip of a robotic manipulation system. Application to a fingertip can enable a high resolution, more sensitive robotic skin. Such a device can resolve forces and torques by arranging the skin and electrode system, which can enable six degrees of freedom forces and torques using electrodes in the skin. The electrodes can be arranged to permit sensing over three-dimensional (3D) space. Machine learning techniques can then be used to transform deformations of the skin into forces and torques in 3 dimensions each.

The electrodes can be distributed in the skin, such as at the periphery of the skin or in various other configurations. The electrodes can be positioned in key positions under the conductive skin by routing wires through the housing to provide electrical contact. Signals can be received from the electrodes, which can correspond to impedance measurements made by the electrodes. This can increase spatial resolution of the device by providing additional boundary condition definitions for electrical impedance tomography (EIT).

Figure 1C:
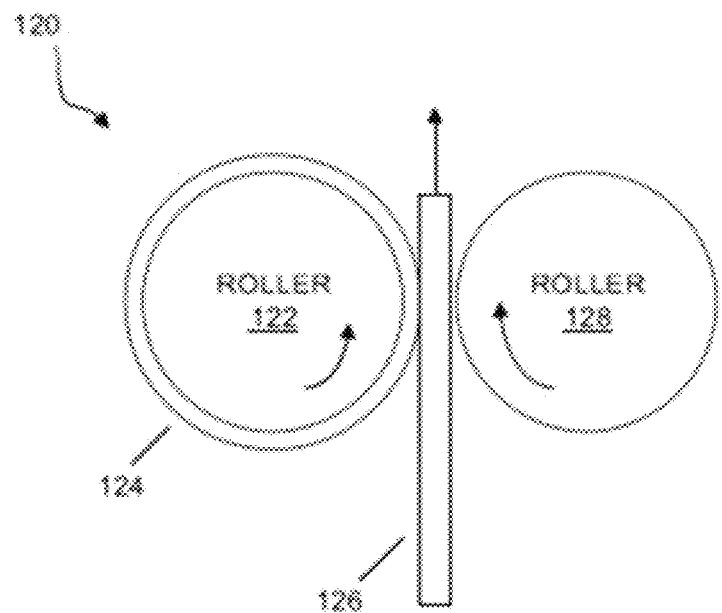

FIG. 1C shows another physical arrangement of a sensor, in accordance with some embodiments. In system 120 two counter-rotating rollers 122 and 128 act to feed material 126 through the gap between rollers 122 and 128. This arrangement is found in various industrial processes and manufacturing, for example paper and cardstock production. These systems often require monitoring for various purposes, including wear, failure, and to maintain tolerances. In system 120, roller 122 is coated with elastomer skin 124. Elastomer skin 124 can be configured to sense the force distribution where roller 122 contacts material 126 and roller 128. The resulting force distribution is useful in monitoring the machinery and process. In some cases, the data is processed and displayed in real time to an operator or presented to an automated monitoring system. Data can be collected and stored for later use in maintenance and process control or improvement. In some situations, a failure in system 120 is detected by observing skin 124 and provides a signal to stop the motion or shutdown machinery.

Figure 1D:
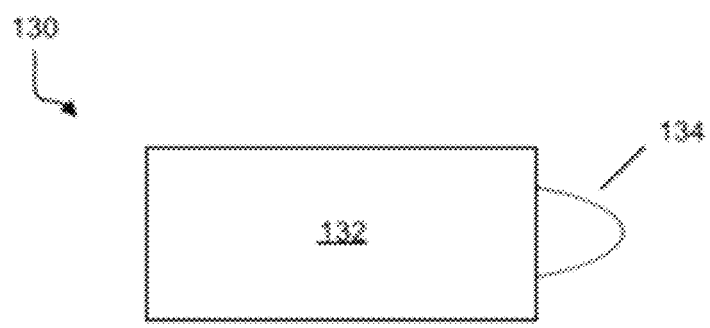

FIG. 1D shows another schematic depiction of a physical arrangement of a sensor, in accordance with some embodiments. System 130 includes mounting substrate 132 and elastomeric sensing finger 134, thus forming a probe. The probe created by mounting sensing finger 134 onto substrate 132 can be moved rather than having objects move to contact a fixed-position sensing elastomer. The substrate 132 can be formed of a polymeric material. In some cases, the substrate includes a polymeric material and other materials, such as a fabric. The fabric can be formed of a material that can bond to the polymeric material. In some examples, the fabric is one or more of cotton, silk and polyester.

The arrangements of FIGS. 1A-1D are illustrative and non-limiting. It will be appreciated that there are other possible physical arrangements incorporating a sensing elastomer.

Figure 2:
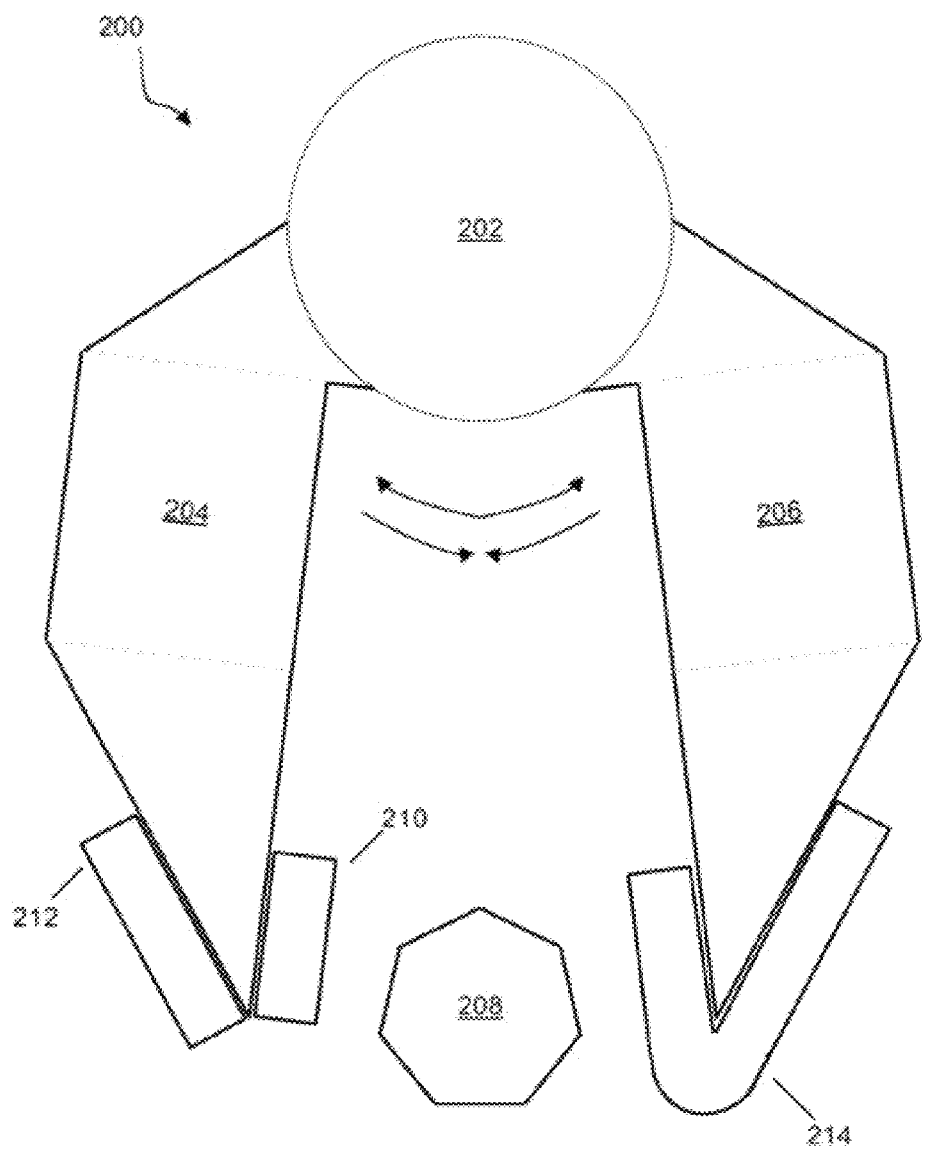
FIG. 2 is a schematic depiction of a robotic gripper.

Sensors of the present disclosure can be mounted on manipulation members (or devices), such as robotic grippers. FIG. 2 schematically illustrates a robotic gripper system 200. Gripper 200 comprises rigid gripper fingers 204 and 206 joined at rotating joint 202 so that fingers 204 and 206 can open and close to grasp object 208. Robots that can be configured similar to gripper 200 are available from FANUC America of Rochester Hills, Mich. and Kawasaki Robotics (USA) of Wixom, Mich.

Sensing elastomer pad 210 can be applied to gripper finger 204 of gripper 200 and configured to observe changes in applied forces over time, and in particular to provide near-real time observation of forces at pad 210. Elastomer pad 210 in combination with sensing electronics as described herein provides information on the contact between finger 204 and object 208. For example, the information may include normal force applied, sheer or slipping force, and data about the orientation of object 208. This information is useful in grasping delicate objects where it is essential to control the gripping force and ascertain adequate grip before attempting to move object 208.

Still referring to FIG. 2, sensitive elastomer 212 can be applied to gripper finger 204. Elastomer 212 is attached to the outer surface of finger 204 and is used to detect contact between finger 204 and other surfaces. For example, this is useful when gripper 200 is inserted into a box or bin of parts; observing force applied to elastomer 212 can detect contact between the gripper finger 204 and a wall of the box or bin. Thus collisions with objects are detected.

Finger 206 can be fitted with conformal elastomer skin 214. Conformal skin 214 provides the same capabilities as sensitive elastomers 210 and 212. In some cases, skin 214 can be a single piece of elastomer and provides a sensitive surface around the entire tip of finger 206. Elastomer 214 can be formed into a glove finger form that matches the shape and encloses the surface of finger 206. Various techniques described herein determine the location of forces applied to skin 214 so that contact with object 208 and with other entities such as walls, bins, and other obstructions can be separately detected.

A gripper can include sensors provided herein. A gripping system or mechanism can include one or more grippers. A gripper can be configured to sense various properties of an object, such as an electrical resistance of the object. A gripper mechanism can include multiple grippers that can pass a current (AC or DC) through an object to characterize various properties of the object, such as grip properties. A gripping mechanism can use a magnetic or electrostatic force to grasp an object.

Figure 3:
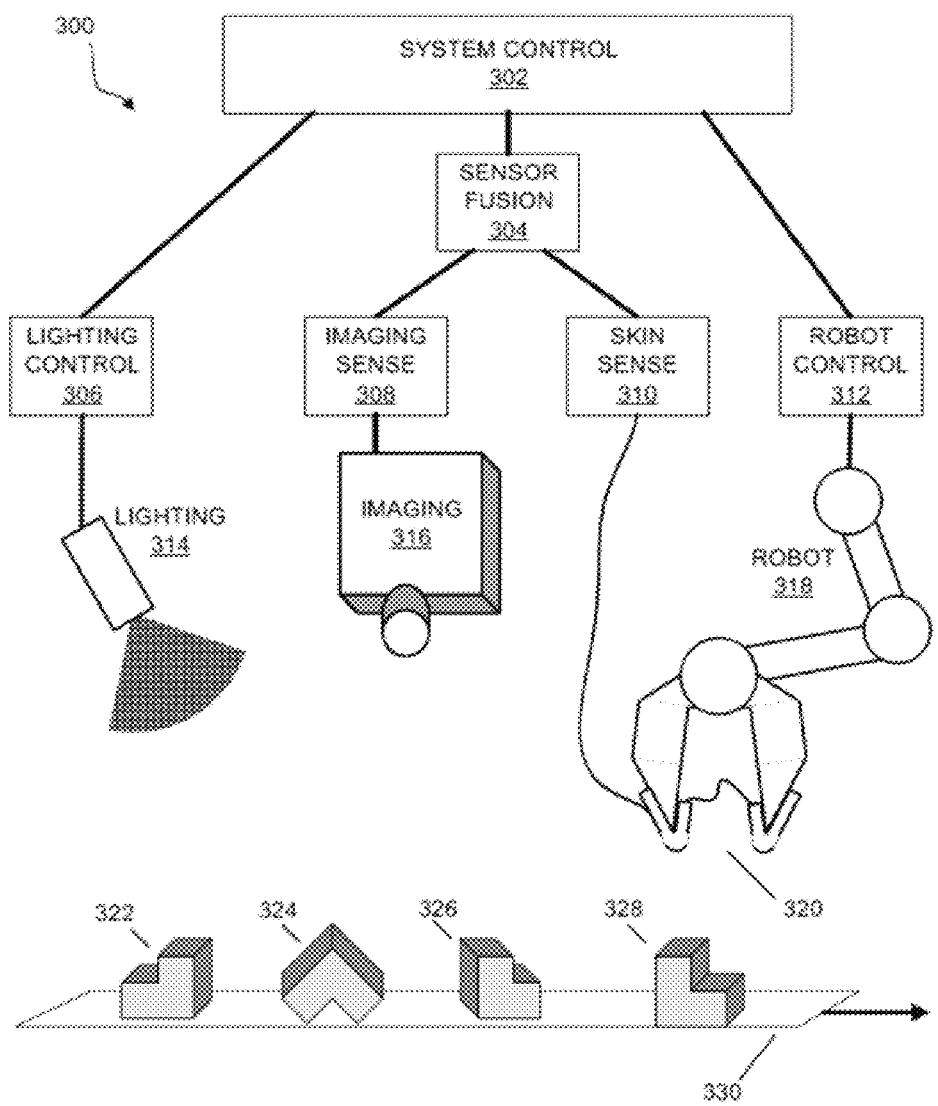
FIG. 3 is a schematic depiction of an arrangement of components which may be used to implement sensors of the present disclosure.

FIG. 3 is a schematic depiction of an arrangement of components which may be used to implement devices and systems of the present disclosure, which may incorporate multiple sensors. System 300 is representative of an automatic, repetitive industrial process where a series of objects 322, 324, 326, and 328 are moved on conveyer 330 to be grasped and manipulated by robot 318. It can be seen that the objects 322, 324, 326, and 328 are in different and arbitrary orientations, which complicates the sequence of motions and forces required of robot 318 in manipulating them without causing damage either due to excess force or dropping. Robot 318 is equipped with sensing elastomer skin 320 to determine forces applied to objects grasped. Skin sense electronics 310 are connected to skin 320. This connection may be through any suitable data communications interface, including for example, wire, optical fiber, or a wireless data link.

Imaging system 316 provides visual data about the orientation and position of objects 322, 324, 326, and 328. Exemplary vision systems include the KINECT available from Microsoft Corporation. Imaging system 316 is connected with imaging sense electronics and processing 308. Data from imaging sense electronics 308 and skin sense electronics 310 can be fused (e.g., aggregated) in sensor fusion 304. Sensor fusion 304 provides a more complete awareness of the situation and orientation than available from either visual or tactile sensing alone.

System controller 302 can provide closed-loop control. Sensing inputs from sensor fusion 304 provide visual, tactile, and integrated information about the situation on conveyer 330. Controller 302 sends commands to robot controller 312 to control robot 318. System controller 302 also sends commands to lighting controller 306 to adjust light provided by light source 314. Lighting is critical to visual systems, and adjusting lighting angle, intensity or type provides additional capability. For example, bright diffuse lighting in the human visual spectrum is best in some situations. Laser scanning or infrared illumination is useful in others, and in some situations a combination of lighting applied either simultaneously or in sequence, can yield more useful visual information. Thus, system controller 302 can control light source 314 to adjust the illumination detected by imaging system 316.

Figure 4A:
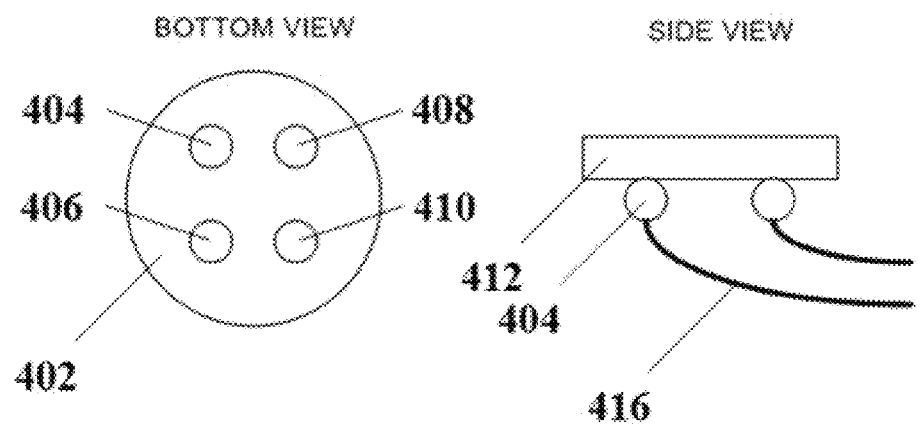
FIGS. 4A, 4B, and 4C depict techniques for providing electrical connections for sensors of the present disclosure.
Figure 4B:
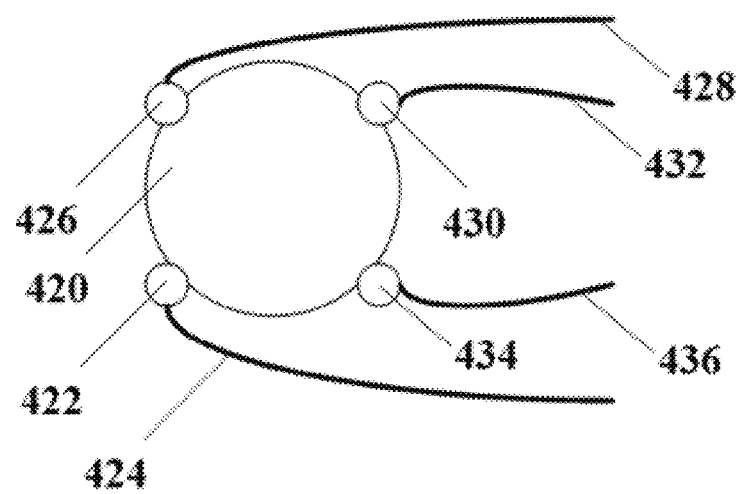
Figure 4C:
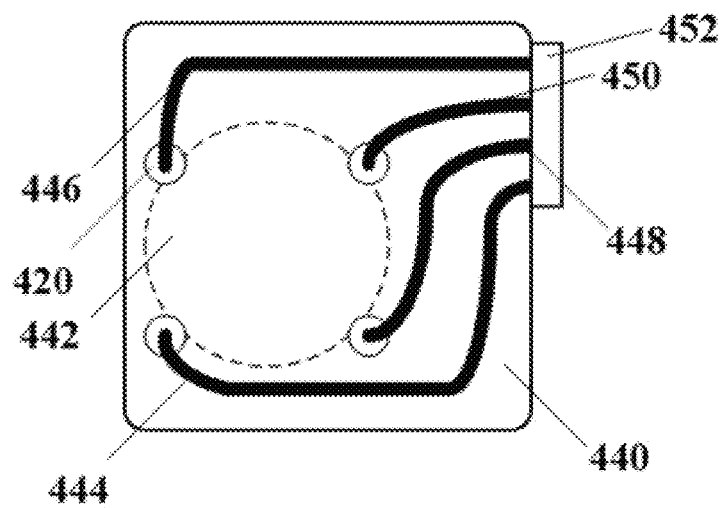

FIGS. 4A, 4B, and 4C depict techniques for making electrical connections. FIG. 4A shows electrical connections applied at various points in sensing elastomer 402 and 412. Note elastomer 402 is a bottom view and elastomer 412 is a side view. Four contact points 404, 406, 408, and 410 are shown. Four contact points are shown for illustration. In other cases, more contact points are included, such as at least about 5, 6, 7, 8, 9, 10, 11, 12, 13, 14, 15, 16, 17, 18, 19, 20, 30, 40, 50, 60, 70, 80, 90 or 100 contact points.

With reference to FIG. 4A, referring to elastomer 412, a representative contact point 414 is connected to electrical wire 416 which connects to sensing electronics and excitation circuitry. It can be seen that this arrangement places stress on the contact point 414 and wire 416 which may lead to breakage and failure.

FIG. 4B illustrates a sensor with an elastomeric skin 420 that has peripheral contact points 422, 426, 430, and 434. Contact points 422, 426, 430, and 434 electrically connect respectively to wires 424, 428, 432, and 436. Moving contact points to the periphery of elastomeric skin 420 can provide greater robustness and resistance to damage from applied forces to elastomeric skin 420.

However, peripheral contact points 422, 426, 430, and 434 may require more sophisticated electronics and processing algorithms to obtain desired sensing and resolution of forces applied to elastomeric skin 420. In an example, Electrical Impedance Tomography (EIT) is used to detect pressure distributions over conductive compliant skins. EIT is a non-invasive technique that measures the internal impedance of a material through a distribution of electrodes at its boundary. Generally, EIT involves measuring sets of impedances from various electrode combinations and then combining the measurements through application of an inverse problem solving technique, to yield an impedance distribution. This distribution is then related to various properties of the elastomer, for example density or pressure, depending upon the application. Materials amenable to EIT techniques include conductive woven yarns, carbon or metal embedded rubbers, each using various algorithms to yield tomographic maps. EIT can be performed when an object is in contact with one or more of the contact points 422, 426, 430 and 434, and in the absence of an object in contact with the contact points.

In some cases, the Electrical Impedance and Diffuse Optical tomography Reconstruction Software (EIDORS) software package in Matlab® can be used to evaluate a pressure profile across the entire area of the sensor. Each 14×16 matrix of voltage data is converted into a pressure distribution over the mesh of virtual electrodes or taxels. EIDORS is a software suite for image reconstruction in electrical impedance tomography (EIT) and diffuse optical tomography (DOT).

The resistances evaluated across the set of electrodes can be used to interpret whether an object is in contact with one or more contact points and object shape. For example, a small or narrow object produces a local deformation of the elastomer skin that will cause large changes of resistance for only small population of elements or taxels close to the point of contact.

FIG. 4C shows a sensor with an elastomeric skin 440 that includes a sensing area 442 wherein forces are to be detected, as well as a peripheral area outside area 442. The area of skin 440 outside area 442 is used to form conductive pathways 444, 446, 448, and 450, which can be analogous to electrical wires. A conductive pathway 444 is formed by fabricating skin 440 with volumes of a high-conductivity elastomer treated to be much more conductive than the surrounding material. Such high conductivity elastomer can have a resistivity from about 0.0001 Ohm-cm and 100 Ohm-cm, or 0.001 Ohm-cm and 10 Ohm-cm. Elastomeric skin 440 can be fabricated as a complex matrix including volumes of low-conductivity elastomer for structural support and volumes of high conductivity elastomer for providing electrical connections for voltage and current as well as region 442 for sensing. Such low-conductivity elastomer can have a resistivity from about 10 Ohm-cm and 100 kOhm-cm, or 100 Ohm-cm and 10 kOhm-cm.

This provides a number of advantages. The connection points do not require attachment of wires at points on the periphery. All external connections can be at connector 452, which can be located to provide a robust and convenient connection to electronics.

Sensors of the present disclosure can include any number, arrangement and distribution of contact points. A contact point can be an electrode. For instance, a sensor can include at least about 3, 4, 5, 6, 7, 8, 9, 10, 11, 12, 13, 14, 15, 16, 17, 18, 19, 20, 30, 40, 50, 60, 70, 80, 90 or 100 contact points. A subset of such contact points can be reference (or ground) electrodes during measurement. For example, a given sensor can include eight electrodes that provide power and eight electrodes that are reference (or ground) electrodes.

A sensor can have contact points of various configurations and arrangements, such as circular, triangular, square, rectangular, pentagonal, hexagonal, heptagonal, or octagonal arrangements, or arrangements with partial shapes or combinations thereof. The contact points can have various packing arrangements, such as close packing (e.g., hexagonal close packing). In some examples, sixteen contact points are used.

Contact points (or electrodes) of the present disclosure can be independently addressable. This can permit a control system to address and obtain a signal from each contact point independently of another contact point, which can be used to generate a matrix of signals from all contact points.

Figure 5A:
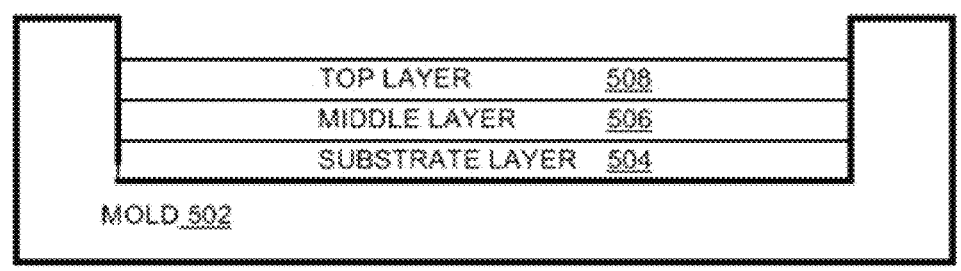
FIG. 5A illustrates a method for fabricating a sensor of the present disclosure.

FIG. 5A illustrates an example method that can be used to fabricate sensors of the present disclosure. Sensors of the present disclosure may require a complex architecture where various elastomers with differing properties are combined in three-dimensional volumes. A number of techniques can be applied to accomplish this combination, and the description here is exemplary of one such technique. In FIG. 5A, mold 502 is formed in a desired or otherwise predetermined shape from material suited to casting elastomeric objects, such as, for example, polysiloxane, polyurethane or other compliant elastomer. Creation of an elastomeric object, component or layer can begin with a raw elastomer fluid in liquid form, which can then be formed and cured.

In FIG. 5A, three layers of liquid elastomer are sequentially poured into the mold and each is cured. Substrate layer 504 is first poured and cured, followed by middle layer 506, and then top layer 508. Each layer may have differing properties. However, as an alternative, greater or fewer layers can be used. An example elastomer can be obtained from Nusil Silicone Technology of Carpentaria, Calif. Various substances are added to liquid elastomers before curing to obtain desired properties. For example, carbon is added to alter conductivity and foaming agents alter density.

The elastomer material can be a blend of a polymeric material, foam and carbon black (or other electrically conductive agent). The polymeric material can be polysiloxane (silicone rubber) or polyurethane, for example. The foam and rubber can come in two-part liquid components that are mixed for the desired mechanical properties. The foam and rubber are obtained in two-part liquid components that are mixed for the desired mechanical properties.

Figure 5B:
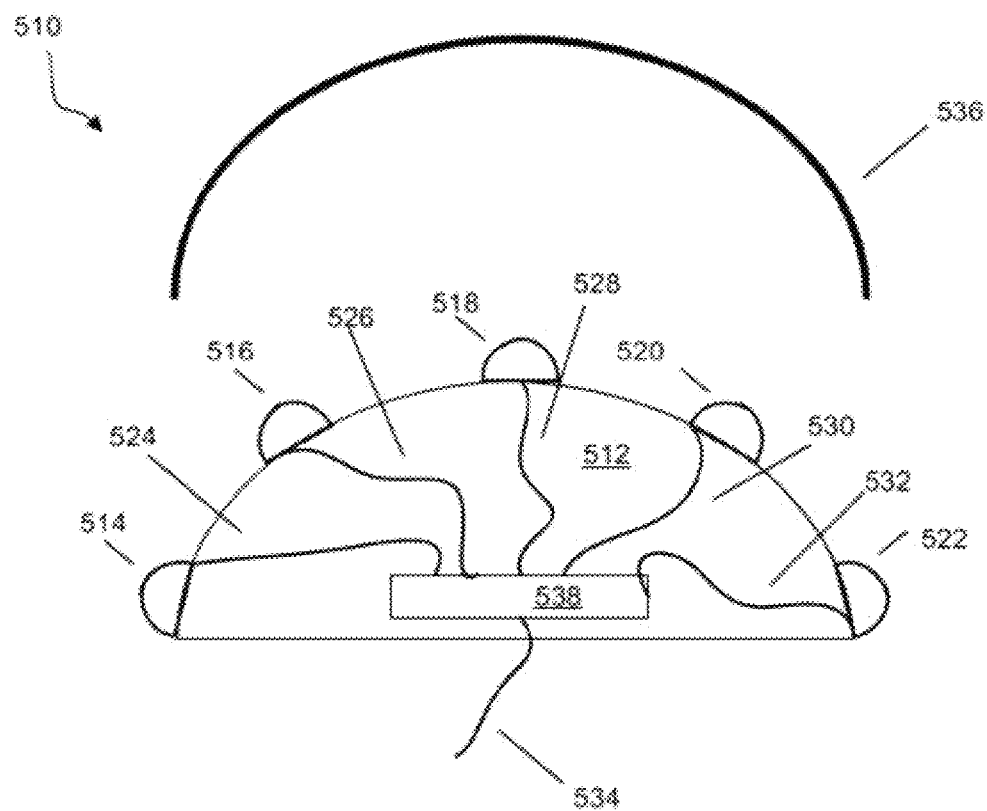
FIG. 5B illustrates components of a sensing assembly.

FIG. 5B illustrates components of a sensing assembly. Sensing assembly 510 comprises a hard elastomer hemisphere 512 and elastomeric cap 536. Hemisphere 512 incorporates various connections and electronics. For example, hemisphere 512 includes conductive sense point (or electrode) 514, wired to embedded electronic bus 538 through conductor 524. The bus 538 can be a printed circuit board (PCB). Similarly, sense points (or electrodes) 516, 518, 520, and 522 are each connected to bus 538 through, respectively conductors 526, 528, 530, and 532. Each of the conductors 524, 526, 528, 530, and 532 can comprise metallic wires embedded in hemisphere 528, or can be formed with conductive elastomeric tunnels, or utilize other approaches to form electrically conductive pathways.

The sensing assembly of FIG. 5B can include any number of sense points. For instance, the sensing assembly can include at least 1, 2, 3, 4, 5, 6, 7, 8, 9, 10, 11, 12, 13, 14, 15, 16, 17, 18, 19, 20, 30, 40, 50, 60, 70, 80, 90, or 100 sense points. The sense points can have various distributions across the hemisphere 528. For example, the sense points can be distributed across rows along the surface of the hemisphere 528.

Figure 6:
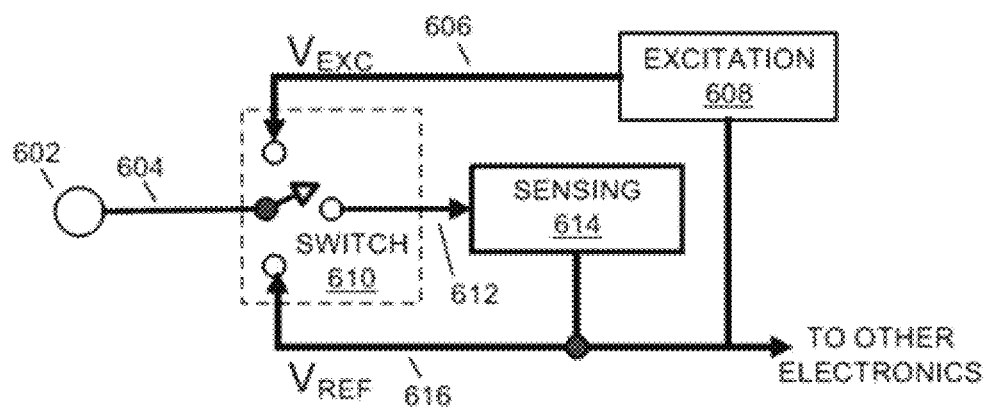
FIG. 6 is a schematic depiction of electronics that can be associated with a sensing assembly of the present disclosure.

FIG. 6 is a schematic depiction of electronics which can be associated with sensors of the present disclosure. Terminal 602 is an electrical connection point from a set of sensing connection points on a sensitive elastomer. To form a sensing device from an elastomer, multiple connection points or terminals similar to terminal 602 are required, spaced and located to facilitate the particular sensing algorithm to be applied to data collected. For example, an EIT algorithm requires a number of terminals spaced to provide multiple distinct conduction paths through the elastomeric sensing area.

An example arrangement uses sixteen terminals (or electrodes) spaced evenly in a circular pattern such that each terminal is spaced 22.5 angular degrees from the adjacent terminal. It is desirable, but not essential, that terminals be arranged such that each of the multiple conduction paths to be excited in the sensing process has the same path length through the elastomer. It will be appreciated that many terminal quantities and arrangements are possible.

Referring again to FIG. 6, terminal 602 is conductively connected through conductor 604 to switch 610. Switch 610 is a three position switch. Switch 610 establishes an electrical connection between terminal 602 and exactly one of excitation electronics 608 through conductor 606, or sensing electronics 614 through conductor 612, or to the reference or ground potential node 616.

In some examples, a sensing elastomeric skin has sixteen attached terminals similar to terminal 602. The sensing procedure applies excitation 608 to one of the sixteen terminals, further simultaneously connecting reference potential 616 to another terminal through another set of electronics, and further simultaneously connecting sensing electronics 614 to the remaining fourteen terminals using other electronics. All of the excitation and sensing electronics are connected to common reference 616 so that each measurement of potential voltage uses the same zero-volt reference, allowing voltages from the several terminals to be compared and differences of potential between terminals to be calculated.

An excitation signal is applied to terminal 602 by excitation 608 through conductor 606, switch 610, and conductor 604. The excitation signal may be a predetermined voltage potential with respect to reference 616, or may be a predetermined current flow between excitation 608 and reference 616. The excitation signal, in some cases, is a direct current (DC) or voltage. As an alternative, an alternating current (AC) or voltage with various waveforms is generated by excitation 608. In some cases, the excitation signal is a predetermined direct current of at least about 1 milliamperes (mA), 2 mA, 3 mA, 4 mA, 5 mA, 6 mA, 7 mA, 8 mA, 9 mA, 10 mA, 15 mA, 20 mA, 30 mA, 40 mA or 50 mA.

Sensing electronics 608 measures the voltage or electromotive potential at connected terminal 602 with respect to reference 610 when switch 604 is appropriately configured. In some cases, sensing electronics 608 measures at terminal 602 instantaneous voltage, average voltage, root-mean-square value of voltage, peak voltage, derivative of the voltage, or a combination of these measurements.

As described further herein below, each of the sixteen terminals corresponding to an instance of terminal 602 serves different functions at different points in time, according to the configuration of switch 604. Each of the sixteen switches that are instances of switch 604 is automatically controlled by a processor executing a data collection algorithm.

Figure 7:
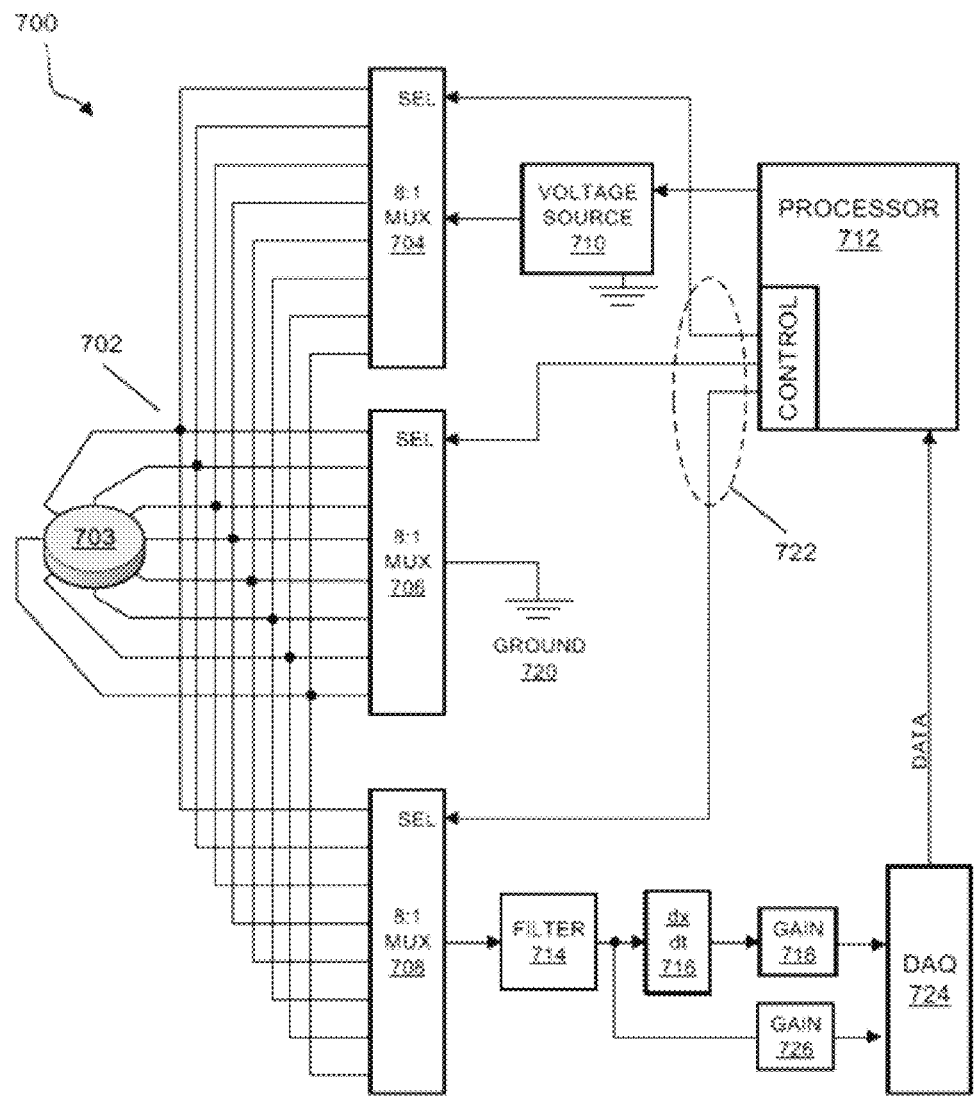
FIG. 7 is an illustration of electronics that can be used with a sensing assembly of the present disclosure.

FIG. 7 is another illustration of electronics that can be used with sensors described herein. Elastomeric sensing system 700 comprises sensitive elastomer 703 connected to sensing electronic components through matrix connection 702, following the drawing convention that crossing lines are electrically connected only when marked with a filled circle. Elastomer 703 is shown with eight connection points for simplicity of description, but those familiar with the art will appreciate that the description of FIG. 7 can be scaled to any number of connection points to elastomer 703 in accordance with the invention described herein.

Three multiplexers 704, 706, and 708 each function to establish an electrically conductive connection between one of the eight connection points and the respective multiplexer or mux output terminal. Thus, voltage source 710, ground 720, and filter 714 may each be connected to one of the connection points to elastomer 703. Control of the selection of which connection point is connected is accomplished by processor 712 through control connection 722 which connects to the select inputs of multiplexer 704, 706, and 708.

Voltage source 710 provides either a voltage or current excitation to elastomer 703. In some cases, source 710 provides a fixed predetermined voltage. Processor 712 can configure source 710 to provide a desired or predetermined voltage and to change the voltage to execute a sensing strategy or algorithm. In some situations, voltage source 710 also contains a current sensor which can be used to vary the voltage to produce a desired current flow in elastomer 703 or to monitor the current. When a voltage and current are known, Ohm's law can be applied to calculate impedance.

In FIG. 7, multiplexer 708 can connect one of the terminals on elastomer 703 to filter 714. Filter 714 can be an anti-aliasing, low-pass, or other filter, either an analog (continuous) or digital (discrete) filter. For example, filter 714 is a filter configured to reject high frequency signals and pass low-frequency signals to reduce noise applied to subsequent processing.

From filter 714 the signal flows to time-derivative operation 716 and to gain 726. Time derivative operation 716 determines the rate of change of the input signal with respect to time. The output of derivative operation 716 is applied to gain stage 718. Gain stages 718 and 726 modify the amplitude of the signal before sending it to data acquisition module 724. The amplitude changes accomplished in gain stage 718 and 726 may apply a gain greater than unity to increase the signal amplitude, or may apply a gain less than unity to attenuate the signal amplitude, or may apply a gain of exactly unity and serve to buffer the signal.

Data acquisition module 724 can convert the signal into digital data suitable for processor 712. In some cases, data acquisition module 724 comprises a sampler to capture and hold the input signal voltage, and an analog-to-digital converter to convert the sampled signal to a numerical representation.

In some situations, the system 700 of FIG. 7 is only capable of measuring data at one terminal of elastomer 703 at any point in time, and collection of data from several terminals requires sequential selection and conversion where multiplexer 708 is controlled by processor 712. As an alternative, two or more points are sampled simultaneously. In an example, multiplexer 708 is replaced by a multi-channel data acquisition module capable of simultaneously sampling all of the input signals applied.

Figure 8A:
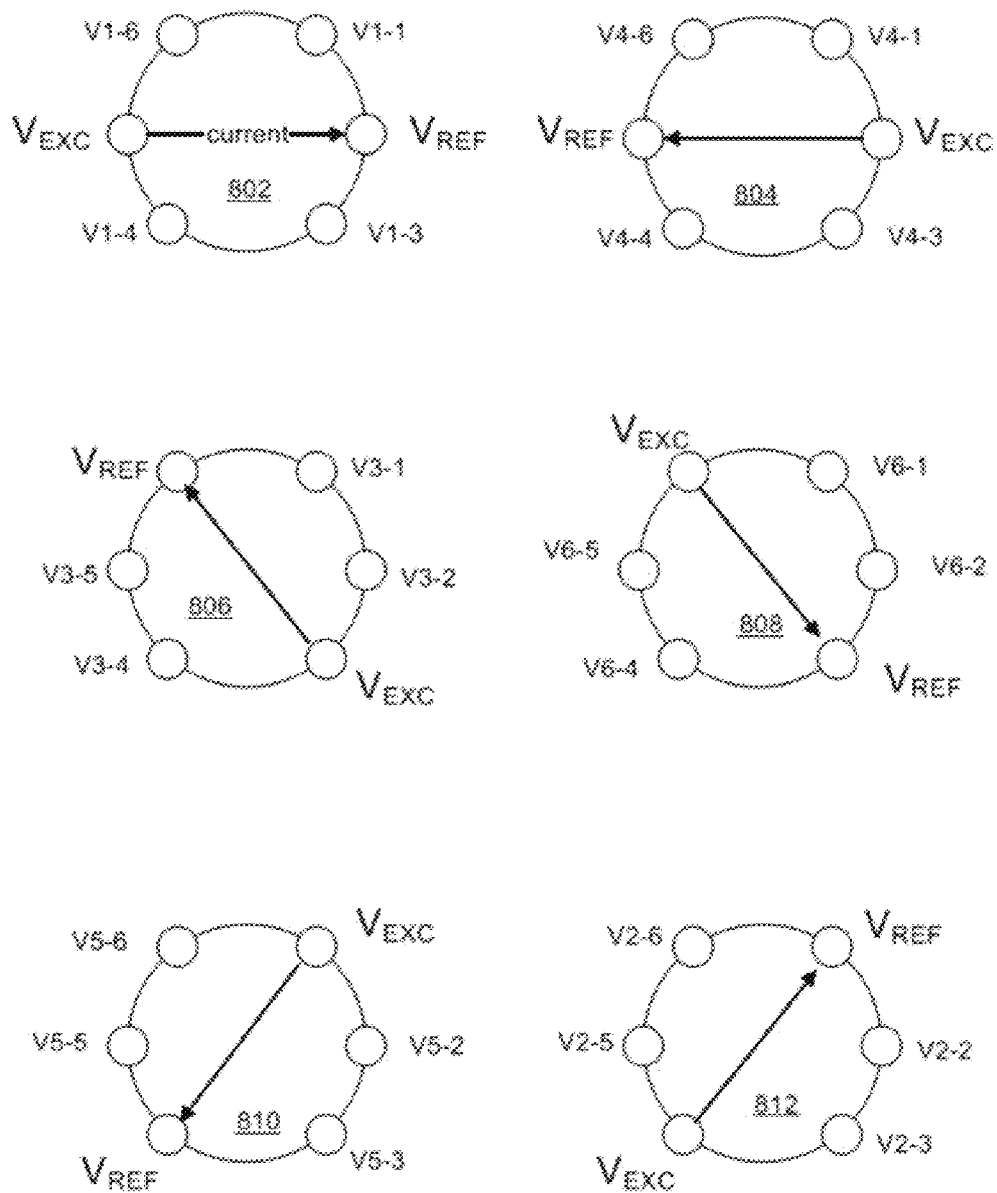
FIG. 8A schematically illustrates an example of a sequence of operations that can be used to collect data from electrodes of a sensing assembly.

FIG. 8A schematically illustrates a sequence of operations for collecting data. An elastomer with six terminals is shown for reference and each of six different excitation and measurement situations that are performed in sequence is shown in excitation 802, 804, 806, 808, 810, and 812.

Figure 8B:
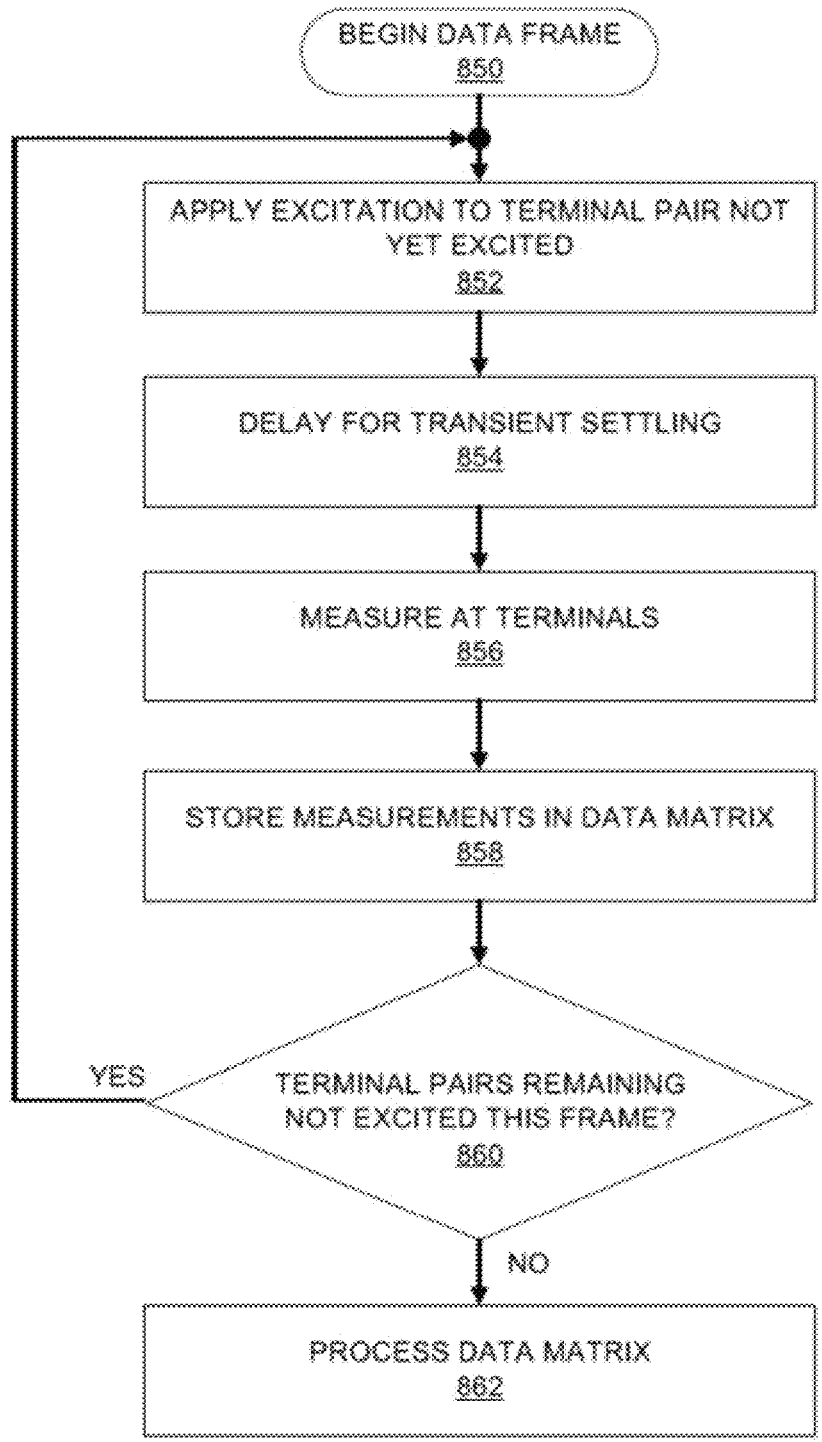
FIG. 8B is a flow chart depicting a sequence of operations for collecting data from electrodes of a sensing assembly.

FIG. 8B is a flow chart depicting a sequence of operations for collecting data. Collection of a frame or set of data begins at 850. At 852, excitation is applied across a pair of terminals. At 854 a delay is applied to allow any transients to settle before measurement. The measurement of terminals is performed at 856. In an example, measurement 856 comprises measuring the voltage at every terminal. In another example, only the terminals not excited are measured.

The measured data are stored in a data structure at 858. At 860 a decision is made as to whether all data has been collected for the present frame or if there are further terminal pairs that can receive excitation to complete the sensing algorithm. If there are further terminal pairs to be excited, execution continues at 852. If not, execution continues at 862 where the collected data is processed.

Figure 9A:
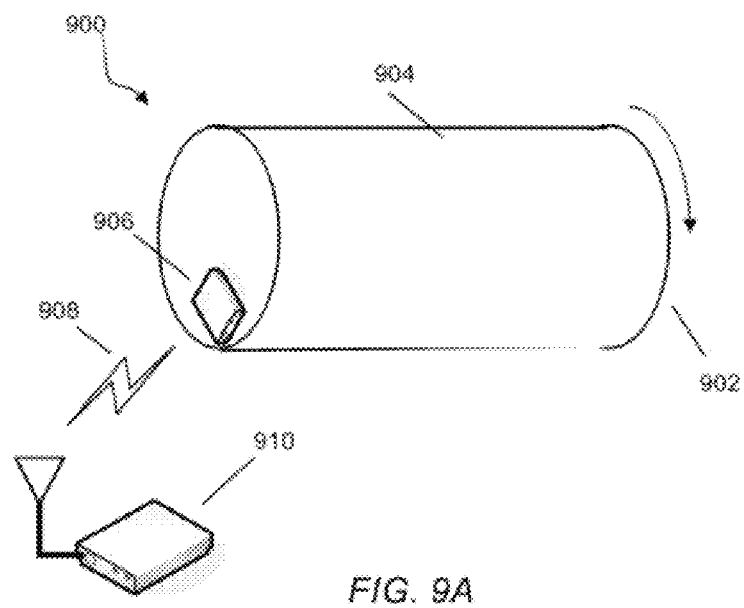
FIG. 9A schematically depicts a wireless connection to a rotating machine.

FIG. 9A schematically depicts a system comprising a wireless connection to a rotating machine. Wireless connections to moving machinery can pose particular challenges in both applying power and collecting data. In FIG. 9A, system 900 can address this issue by eliminating wires connecting the elastomeric sensor and the processing and storage of data. The exterior curved surface of rotating machinery 902 is covered with elastomeric skin sensor 904. Elastomeric skin sensor 904 is connected to rotating electronics module 906. Rotating module 906 communicates with fixed electronics module 910 using wireless communication link 910.

Figure 9B:
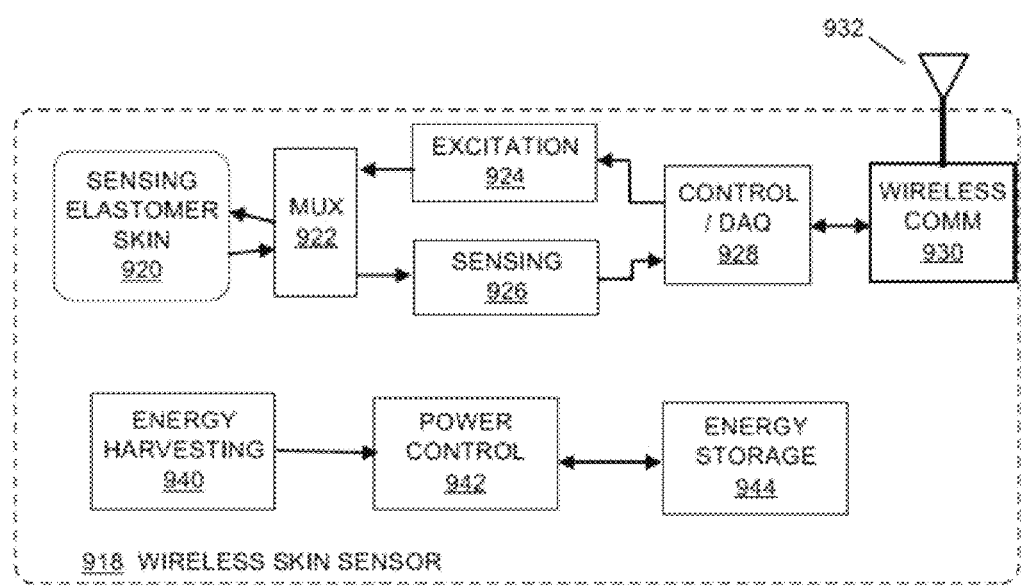
FIG. 9B is a schematic illustration of components arranged to perform wireless sensing and communication.

FIG. 9B is a schematic illustration of components arranged to perform wireless sensing and communication. For example system 918 of FIG. 9B corresponds to rotating electronics module 906 in FIG. 9A. Elastomer sensor 920 is connected through multiplexing electronics 922 to excitation 924 and sensing 926, controlled by data acquisition module 928. Module 928 performs the sequence of applying excitation and collecting data needed for sensing forces applied to skin 920. The data collected is then transmitted from wireless communication 930 using antenna 932. It should be appreciated that a variety of communication schemes can be used according to the environment and performance. For example, short range communication schemes such as Bluetooth, line of sight optical communications, or various radio frequency modulation schemes are useful. In some examples, near field communications technology is used.

Another challenge that arises in collecting data from an elastomeric skin attached to a rotating machine is that of supplying power to the excitation and sensing electronics. In FIG. 9B, power for sensor 918 is routed through power control module 942. Power control module 942 obtains power from one of two sources. The first source is energy storage device 944, which may be a replaceable or rechargeable energy storage device utilizing technologies such as supercapacitors, lithium ion battery cells, nickel metal hydride battery cells or NiCd battery cells. Other energy storage technologies available now or to be discovered in the future can be applied without departure from the invention disclosed herein.

Another energy source is energy harvesting module 940. The energy harvesting module uses vibration, heat, or motion to generate power to operate sensor system 918. Energy from module 940 is routed to the electronics or to recharge energy storage 944.

Figure 10A:
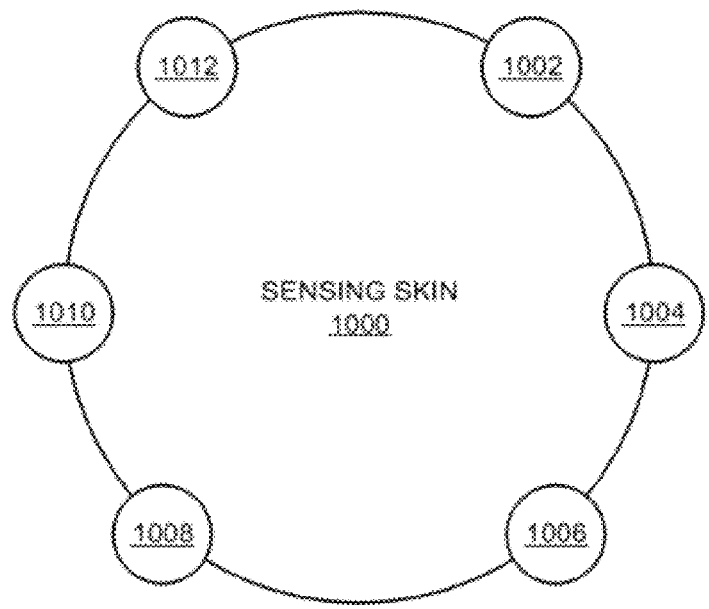
FIG. 10A schematically depicts a sensing elastomer and electrical connection points.

FIG. 10A schematically depicts a sensing elastomer and electrical connection points. Sensing skin 1000 is shown with six connection points 1002, 1004, 1006, 1008, 1010, and 1012.

Figure 10B:
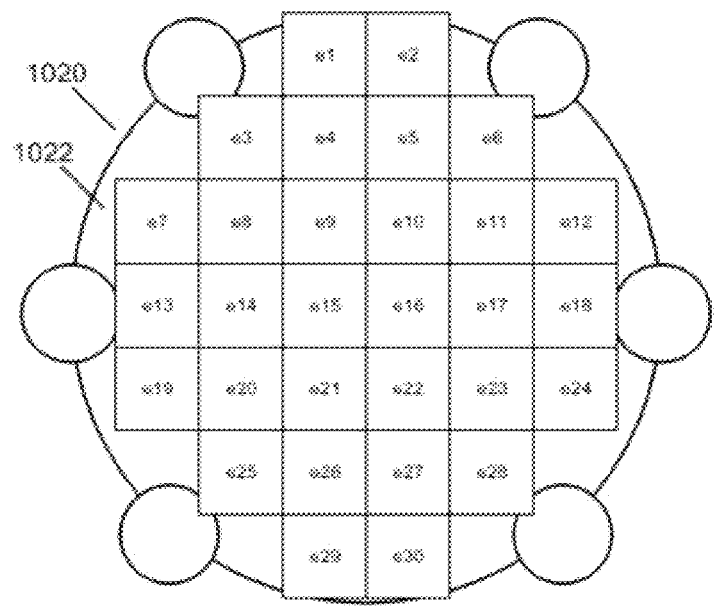
FIG. 10B depicts an array of sensing elements or "taxels" overlaid on a sensing elastomer.

FIG. 10B depicts an array of sensing elements or "taxels" overlaid on a sensing elastomer. Sensing skin 1020 corresponds to sensing skin 1000 in FIG. 10A. A grid or map 1022 is overlaid on skin 1020 to facilitate location of sensed forces. It should be appreciated that grid 1022 is not a physical grid, but is a model used to refer to points on the grid. Each element of grid 1022 is referred to as a "taxel," meaning a tactile sensing element. Although grid 1022 is illustrated as a tiling of square taxels, taxels of various shapes can be used, including hexagons and rectangles.

Figure 11:
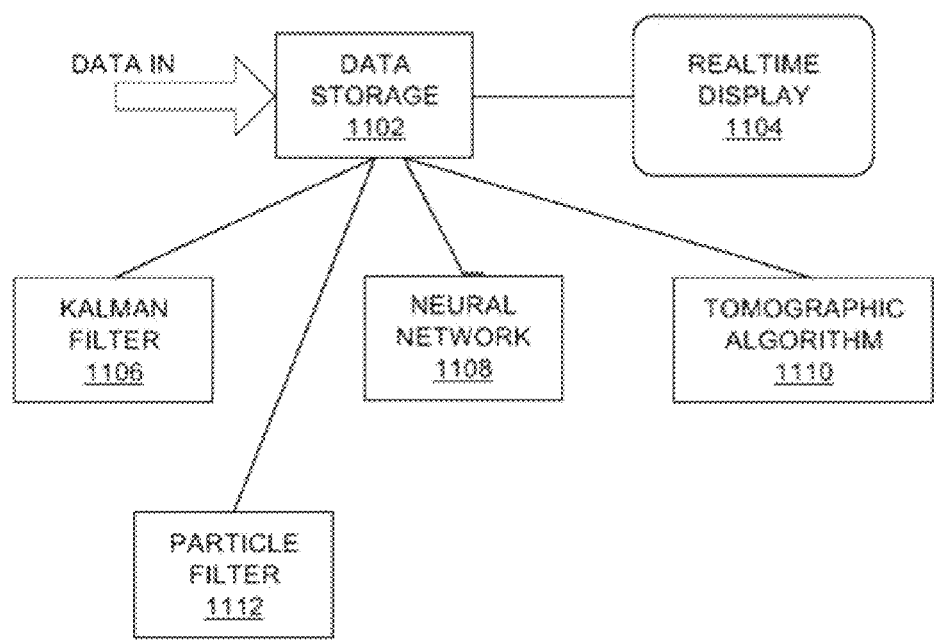
FIG. 11 schematically depicts an example of a data process workflow.

FIG. 11 schematically depicts a workflow for processing sensor data, in accordance with some embodiments. Data collected from an elastomeric skin are transmitted to data storage 1102. Data storage 1102 is also used to store the results of applying various data processing algorithms. Data processing algorithms are applied to determine the pressure, force and torque distribution from measurements of properties of the elastomeric sensor. In FIG. 11A representative processing algorithms are shown for illustration. Algorithm 1106 is a Kalman filter, algorithm 1108 is a neural network, algorithm 1110 is a tomographic algorithm, and algorithm 1112 is a point cloud which may employ a particle filter. In some cases, these and other algorithms may be applied individually or in combination. The results are displayed on real-time display 1104.

Figure 12:
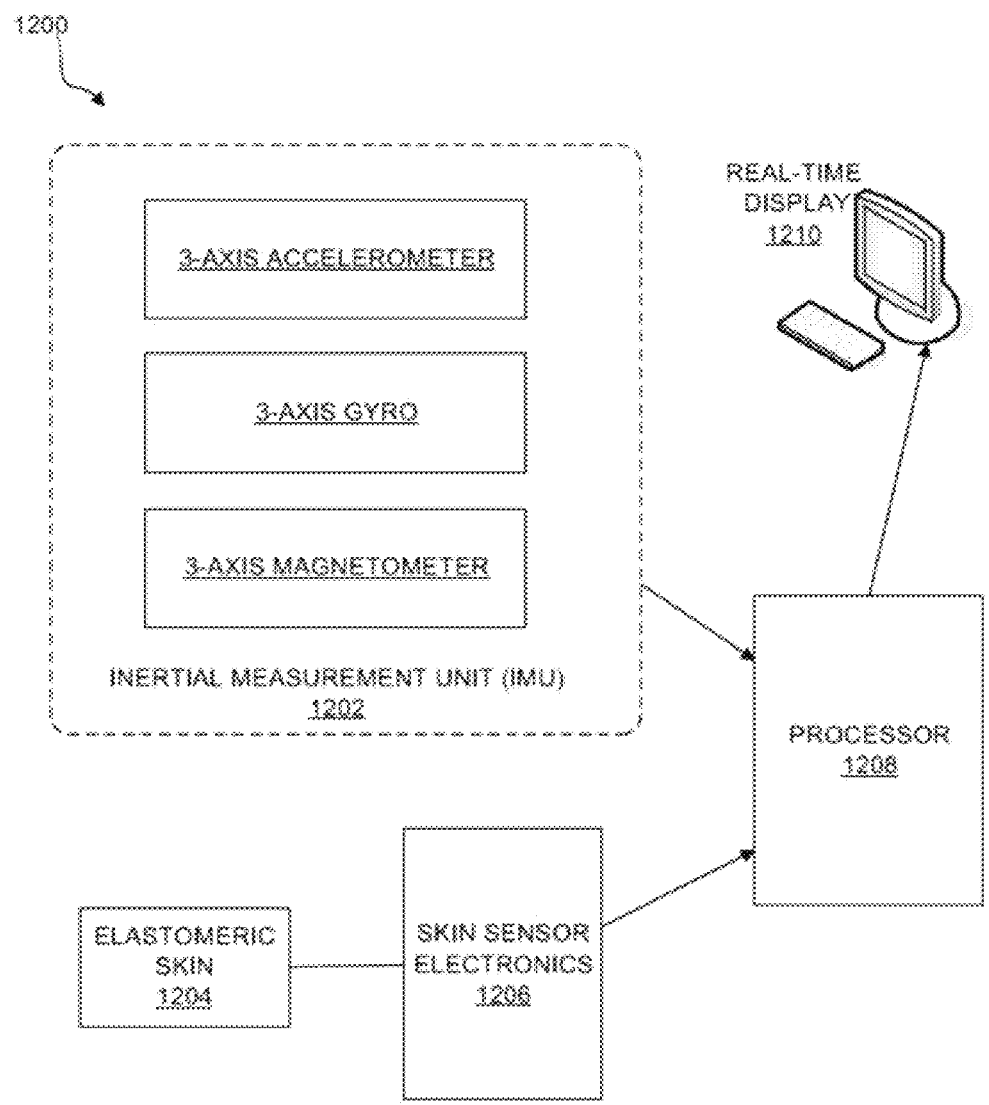
FIG. 12 schematically depicts a sensing system comprising various integrated sensors.

FIG. 12 schematically depicts integration of other sensors, in accordance with some embodiments. In system 1200, Inertial Measurement Unit (IMU) 1202 includes sensors for acceleration (accelerometer), rotation (gyro), and magnetic fields (magnetometer) in three axes. This is representative of small, inexpensive IMU packages now found on smartphones or other electronic devices. A sensor for acceleration can be configured to sense skin acceleration. Such a sensor can sense vibrations at a contact surface with accelerometers to detect slip and texture. As an alternative or in addition to, a piezoelectric material can be used, which can generate a voltage when deformed.

Elastomeric skin 1204 and associated electronics 1206 determine force and pressure distribution at elastomeric skin 1204. Processor 1208 combines force and pressure data from skin sensor electronics 1206 with rotational and translational rate data from IMU 1202. In some cases, data from different sensors are combined to yield results not available from any individual sensor. As an alternative, data from noisy or low precision sensors are combined and processed to yield data of greater fidelity or accuracy. The results can optionally be displayed on display 1210.

Figure 13:
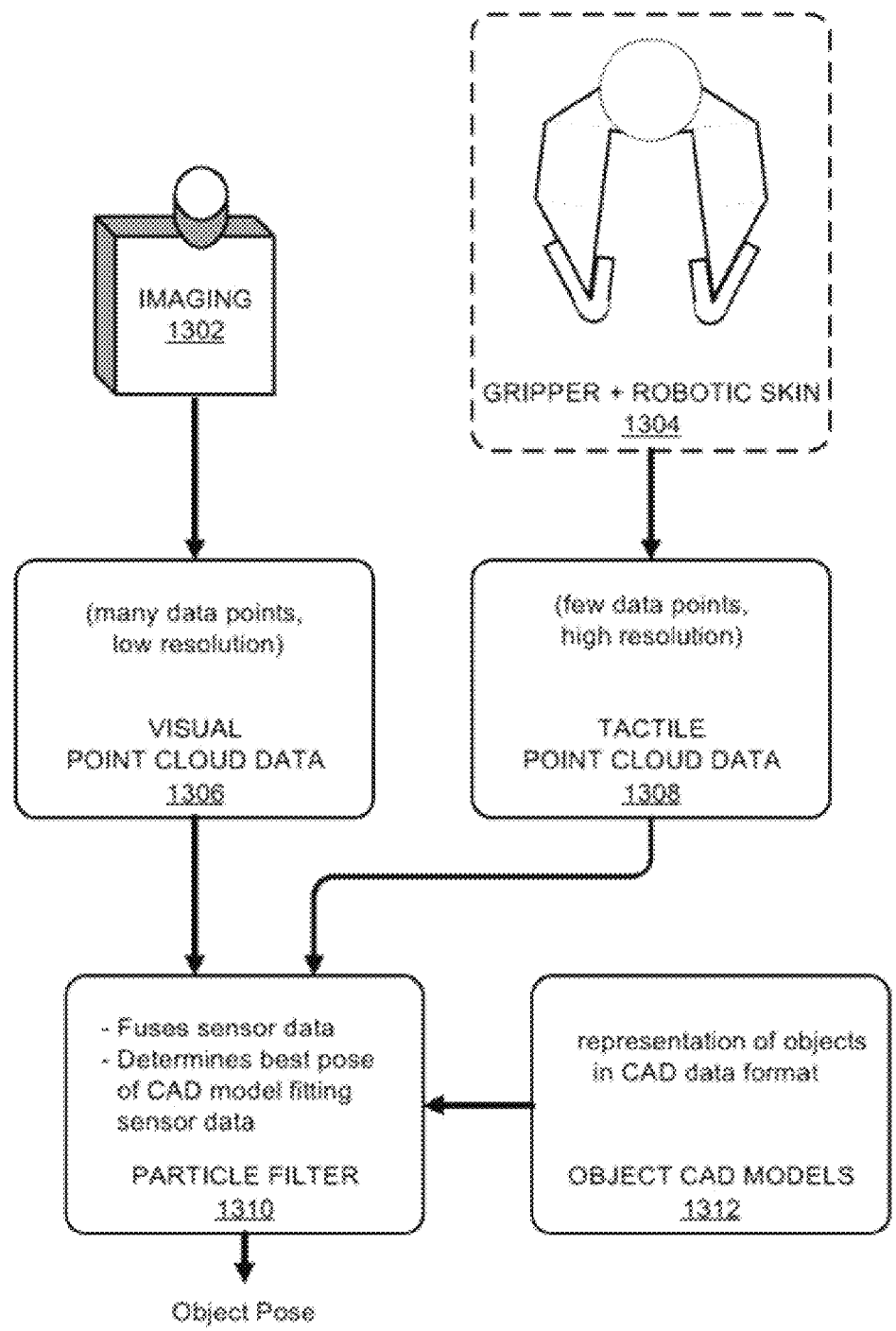
FIG. 13 schematically depicts an example of a data process workflow.

FIG. 13 schematically depicts a workflow for processing sensor data, in accordance with some embodiments. Vision data is collected by imaging system 1302 and stored as visual point cloud data 1306. Tactile and gripper data is collected by gripper and robotic skin 1304 and stored as tactile point cloud data 1308. Typically these data sets correspond to a physical object present in the environment. Often it is desired to automatically locate or manipulate an object using a robotic gripper or arm without human intervention. Cloud data can be stored in an electronic storage medium, such as memory, which can be located locally or remotely (e.g., in the cloud) from a sensor used to collect the data.

Models of various objects which may be encountered in the environment are stored as CAD models 1312, which are converted to point cloud data for transfer to particle filter 1310. Particle filter 1310 fuses data from point cloud data 1306 with point cloud data 1308 and further determines the CAD model from data 1312 that fits the fused sensor data. The result of particle filter 1310 is robust resolution of object pose regardless of visual occlusion of gripper. This facilitates automatic manipulation of objects by a robot, such as pick and place tasks.

It should be appreciated that although the description above teaches detection and manipulation of a single object at a single point in time, the invention described herein is capable of detecting multiple objects and dealing with motion and changes in the objects position and orientation in real time.

It is important to define some terms as used in relation to computer vision and machine vision algorithms. A "point cloud" is a set of points in three-dimensional space corresponding to the surface of a physical object. A point cloud is obtained by scanning an object, as with a computer vision system, or from a model representing the object in a computer aided design (CAD) system.

The "pose" of a physical or virtual object is the combination of its position and orientation in a coordinate system. A "particle filter" forms a probability-based estimate of the future position of an object or set of points given some past history.

The "Mahalanobis distance" is a measure of distance between two points in multi-dimensional space which takes into account the mean and covariance in each dimension of all data points. Essentially the data points are mapped into a new coordinate system, wherein the transformational mapping is determined by the distribution of the data points.

In an example, a particle filter makes an initial estimate of pose based on vision data and further refines the estimation by including tactile (e.g., pressure or impedance) data. The vision data can be associated with a first set of data and the tactile data can be associated with a second set of data, and the first set can be larger than the second set of data. The particle filter architecture uses the "proximity measurement model" which has been used in stereo vision and is known as "likelihood fields" in mobile robotics. Each measurement (both vision and tactile) is comprised of a set of position vectors and surface normal vectors in six dimensional space, labeled "data points". That is, each measurement is a point cloud with each point having a corresponding surface normal vector direction. For each data point (M) a closest point (O) on a known CAD model is found. The pose difference (D) for the data point is calculated based on the equation below.

$$D_{position,normal} = \sqrt{\frac{(O_{position} - M_{position})^2}{\sigma^2_{position}} + \frac{(O_{normal} - M_{normal})^2}{\sigma^2_{normal}}}$$

In this equation, σ is Gaussian noise variance and the CAD model is at an a priori pose in six dimensional (6D) space, each comprising three positions and three normal vectors. D is then the Mahalanobis distance between O and M. D is calculated for each data point in the measurement. The sum of all D's is then the "total distance" of the measurement from the CAD model. The particle filter represents the probability distribution of the CAD model poses in 6D, where each particle is a point in 6D CAD model pose space. The particle filter is therefore used as a search algorithm for the best CAD model pose that matches the measurement data from the vision and tactile sensors.

Figure 14A:
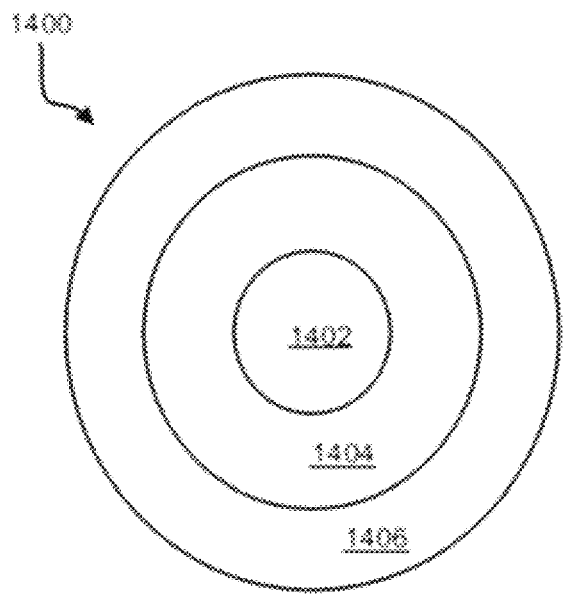
FIGS. 14A and 14B are schematic depictions of an arrangement of components of a sensing assembly.
Figure 14B:
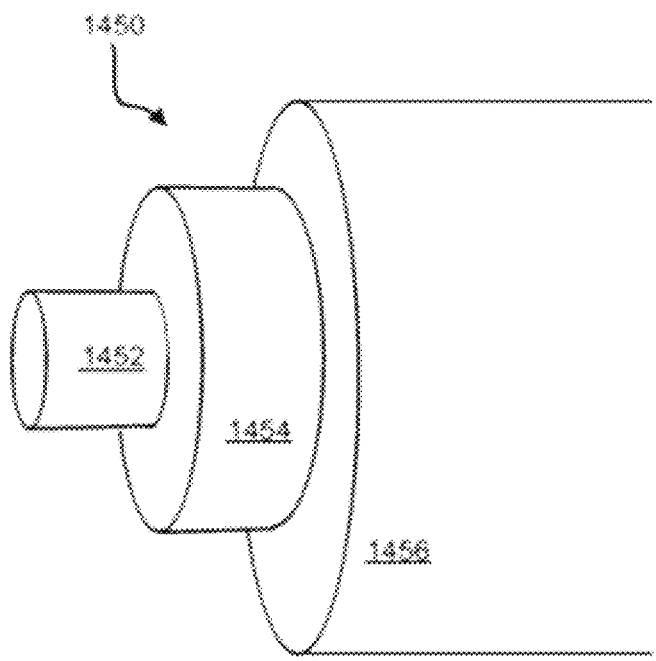

FIGS. 14A and 14B are schematic depictions of an arrangement of components of a sensing assembly 1400. In FIG. 14A, an end view is shown of the assembly 1400. Assembly 1400 comprises multiple volumes arranged as concentric layers. Substrate 1402 occupies the innermost volume. Substrate 1404 is a volume overlaying substrate 1402 in a coaxial manner. Substrate 1406 surrounds substrate 1404. Although substrates 1402, 1404, and 1406 are depicted as cylinders or hollow cylinders sharing a common axis for illustration, other shapes and arrangements of layers are possible. For example the volumes may have square, oval, elliptical, or asymmetrical boundary shape.

An arrangement according to assembly 1400 can be useful in creating a specific composition of elastomeric volumes with desired aggregate properties. For example, the volume of substrate 1404 is a highly electrically conductive material and the volume of substrate 1406 is a much less conductive material, creating an assembly 1400 that is conductive between its endpoints but insulated on the outer surface. Assembly 1400 may also, in some embodiments be a component to be included in other elastomeric compositions or subsequent manufacturing processes.

Both the assembly 1400 and the technique for fabricating assembly 1400 and creating the layered structure provide various benefits over other systems techniques currently available. In one embodiment, substrate 1402 is a high tensile strength flexible filament, for example a string or a wire. Substrate 1402 is then coated in the material to be used to form substrate 1404. In one embodiment substrate 1402 is a cotton string that is dipped one or more times into an uncured liquid elastomer, which are then cured to form a solid elastomer layer. Subsequently, the combination of substrates 1402 and 1404 are dipped or immersed in uncured liquid elastomer desired for substrate 1406 to form the outer volume. Other techniques can be applied to create the volume layers of assembly 1400, including, but not limited to, dip coating and injection molding.

With reference to FIG. 14B, a side view is shown of assembly 1450, which is an assembly of multiple concentric volumes of material. The central volume 1452 is surrounded by secondary material layer 1454, which is further surrounded by a third material layer 1456. Although three volume regions are shown for illustration, any number of layers may be included in assembly 1450. In one embodiment, multiple inner layers are surrounded by an outer layer in a manner analogous to a multi-conductor electrical cable.

Computer Control Systems

Figure 18:
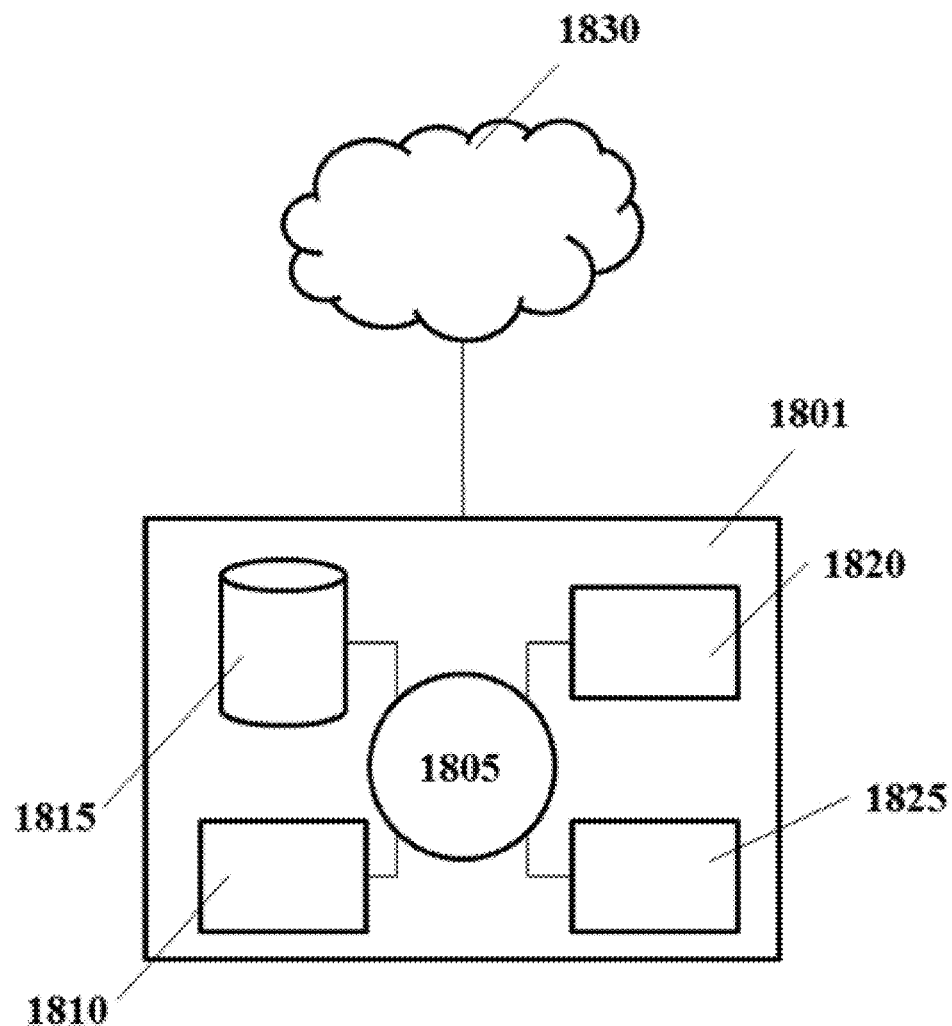
FIG. 18 schematically illustrates a computer system that can be programmed or otherwise configured to implements various devices, systems and methods provided herein.

FIG. 18 shows a computer system 1801 that is programmed or otherwise configured to implement devices, systems and methods of the present disclosure. The computer system 1801 includes a central processing unit (CPU, also "processor" and "computer processor" herein) 1805, which can be a single core or multi core processor, or a plurality of processors for parallel processing. The computer system 1801 also includes memory or memory location 1810 (e.g., random-access memory, read-only memory, flash memory), electronic storage unit 1815 (e.g., hard disk), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 can be a data storage unit (or data repository) for storing data. The computer system 1801 can be operatively coupled to a computer network ("network") 1830 with the aid of the communication interface 1820. The network 1830 can be the Internet, an internet and/or extranet, or an intranet and/or extranet that is in communication with the Internet. The network 1830 in some cases is a telecommunication and/or data network. The network 1830 can include one or more computer servers, which can enable distributed computing, such as cloud computing. The network 1830, in some cases with the aid of the computer system 1801, can implement a peer-to-peer network, which may enable devices coupled to the computer system 1801 to behave as a client or a server.

The CPU 1805 can execute a sequence of machine-readable instructions, which can be embodied in a program or software. The instructions may be stored in a memory location, such as the memory 1810. Examples of operations performed by the CPU 1805 can include fetch, decode, execute, and writeback.

The CPU 1805 can be part of a circuit, such as an integrated circuit. One or more other components of the system 1801 can be included in the circuit. In some cases, the circuit is an application specific integrated circuit (ASIC).

The storage unit 1815 can store files, such as drivers, libraries and saved programs. The storage unit 1815 can store user data, e.g., user preferences and user programs. The computer system 1801 in some cases can include one or more additional data storage units that are external to the computer system 1801, such as located on a remote server that is in communication with the computer system 1801 through an intranet or the Internet.

The computer system 1801 can communicate with one or more remote computer systems through the network 1830. For instance, the computer system 1801 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1801 via the network 1830.

Methods as described herein can be implemented by way of machine (e.g., computer processor) executable code stored on an electronic storage location of the computer system 1801, such as, for example, on the memory 1810 or electronic storage unit 1815. The machine executable or machine readable code can be provided in the form of software. During use, the code can be executed by the processor 1805. In some cases, the code can be retrieved from the storage unit 1815 and stored on the memory 1810 for ready access by the processor 1805. In some situations, the electronic storage unit 1815 can be precluded, and machine-executable instructions are stored on memory 1810.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Example 1

Figure 15:
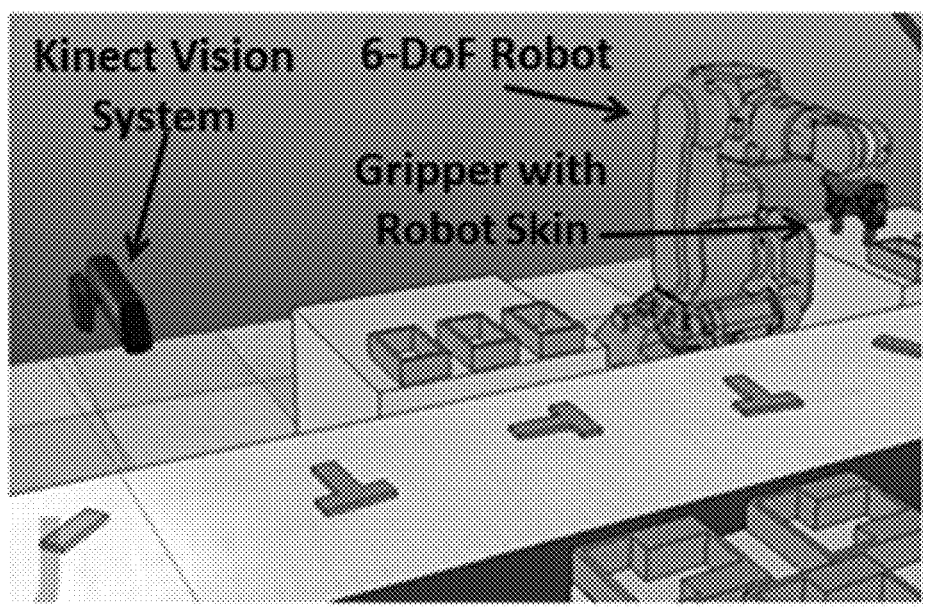
FIG. 15 schematically illustrates a vision system and a robotic gripper.

In an example, FIG. 15 shows an inexpensive tactile and vision system that surmounts environmental problems of existing vision systems. The system includes a robot having a gripper with a skin with a touch sensor. The system further includes a motion sensing input device (e.g., Kinect vision system) that can be calibrated for shorter set-up times for new production runs compared to existing vision based systems. The robot can be configured for six degrees of freedom manipulation. The skin can be shaped to any form factor, including large areas. Algorithms detect position-orientation and force-torque at landmark points for a given object set. The result is a highly scalable (in terms of price, quantity, size, and applications) modular sensing system.

With continued reference to FIG. 15, as objects pass by on a conveyor, guidance information and initial pose is passed to the robot from a the motion sensing input device. The gripper is uses the skin to resolve pose for pick-and-place operation.

Example 2

Figure 16A:
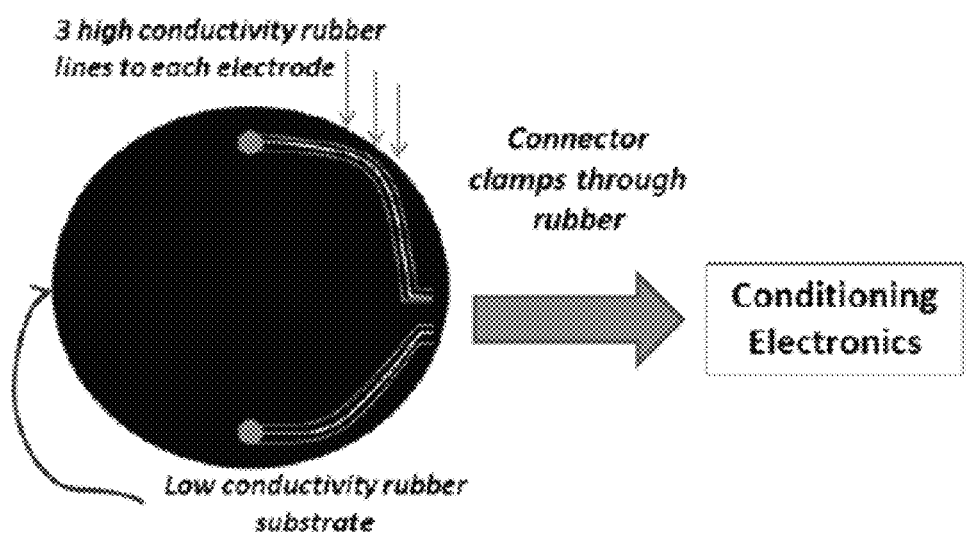
FIG. 16A schematically illustrates a layout of a sensing pad with two sensors.

In another example, FIG. 16A shows a layout of a sensing pad (or sensor). The sensing pad includes a low conductivity rubber substrate and three high conductivity rubber wires that are in electrical communication with two electrodes. The rubber wires can be a highly conductive silicon elastomer (e.g., from NuSil Silicone Technology). The substrate can be a less conductive silicon elastomer. The sensing pad can be designed as an open-top mold and fabricated in hard wax (e.g., milled at 2.54 mm pitch). The elastomer electrodes and wires can be cast into the mold. More substrate can be vacuum injected to complete the elastomer sensing pad. A standard connector can be mechanically clamped to the sensing pad. Additional electrodes and lines can be generated to yield the sensing pad shown in FIG. 16B, which shows a sensing pad with sixteen electrodes (smaller circles). Each electrode can include three lines: a first line for power, a second line for data and a third line for ground. The sixteen electrodes can be part of a sensing skin of the sensing pad.

Figure 16B:
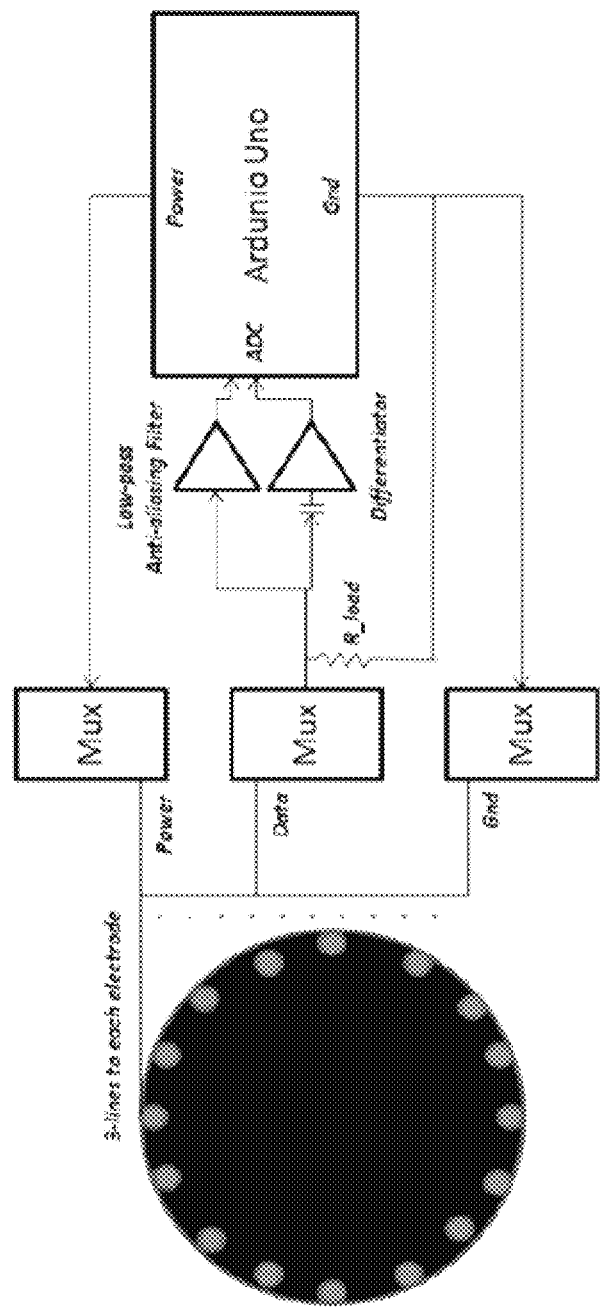
FIG. 16B schematically illustrates a layout of a sensing pad with sixteen sensors.

With reference to FIG. 16B, three 16-channel multiplexers (MUX) can be used to control power, data and ground between each of the electrodes. A printed circuit board (PCB) can be used to filter and split the data signal into raw and differentiated voltage. Voltage measurements can be extracted using a voltage-divider. The exported data can be distributed in a 15×16 matrix. A given data frame can include 14 voltage measurements (each measurement from a sensing electrode) based on the resistance of the material being sensed by the sensing electrodes. An additional measurement is the squared sum of the differentiated signals to determine contact-slip. Power and ground can be assigned to opposing electrode positions as measurements are made with the remaining 14 electrodes. Power and ground increment about the sensor until a complete circle has been made and 16 data frames have been captured. The 15×1 vector can be concatenated into a 15×16 matrix as each measurement frame is built up.

Electrodes can be embedded throughout or under the conductive substrate, and object measurements can be extracted directly from the voltage changes measured by the electrodes. However, the electrodes can be moved to the periphery and a tomographic algorithm can be used to build an image of the pressure distribution of an object in contact with the sensing pad. This can be used to generate a taxel pressure map of much higher density as compared to direct electrode measurements.

In order to evaluate a pressure profile across the entire area of the sensor, an electrical impedance and diffuse optical tomography reconstruction algorithm can be used to convert each 14×16 matrix of voltage data into a pressure distribution over the mesh of virtual electrodes corresponding to actual electrodes of the sensor. The algorithm can be part of a software suite for image reconstruction in electrical impedance tomography and diffuse optical tomography. The resistances (or impedances) evaluated across the electrodes can be used to interpret the shape of the object adjacent to the sensor. For example, a small or narrow object can produce a local deformation of the skin of the sensor that can cause large changes of impedance for only small population of elements close to the point of contact.

Example 3

Figure 17:
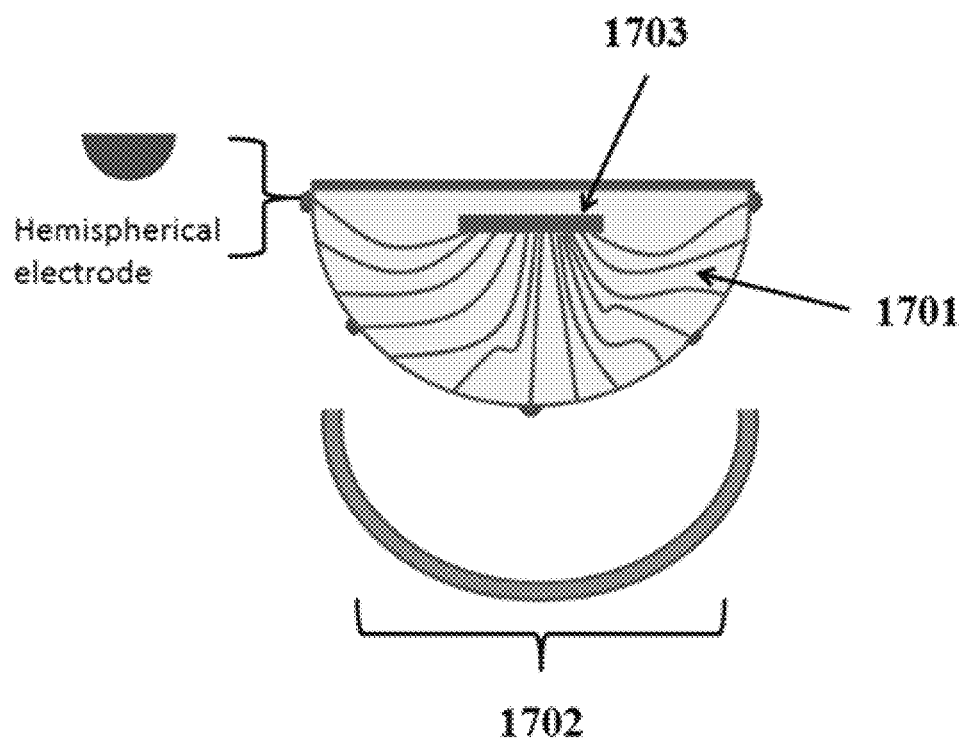
FIG. 17 schematically illustrates an example of a sensor that can be used for various applications, such as sensing an object.

In another example, FIG. 17 shows a sensor comprising an elastomeric molding 1701 and elastomeric skin pins 1702 on a surface of the molding 1701. The sensor further comprises a printed circuit board with conditioning electronics 1703. The blow-up at the left side of the figure shows one of the hemispherical electrodes. The sensor also includes electrodes in the form of wires which are in contact with the surface of housing, thereby making direct contact with the skin.

The hemispherical electrodes can enable the skin to be suspended, such as from the surface of a device. This can enable an increase in sensitivity to deformation, which can have at least two effects. First, only the hemispherical electrodes can be in direct contact with the elastomeric molding 1701, while the other surface electrodes can only be in capacitive contact. If contact with an object causes the skin to deform and contact the surface on an electrode, this abrupt transition can be evident in the signal read from the subject electrode as the resistive element of the conductive rubber is introduced. Second, much less force may be required to bend an elastomer suspended between two points rather than to distort the elastomer once it has made full contact with the device housing (i.e., there may be two different spring constants).

Example 4

Figure 19A:
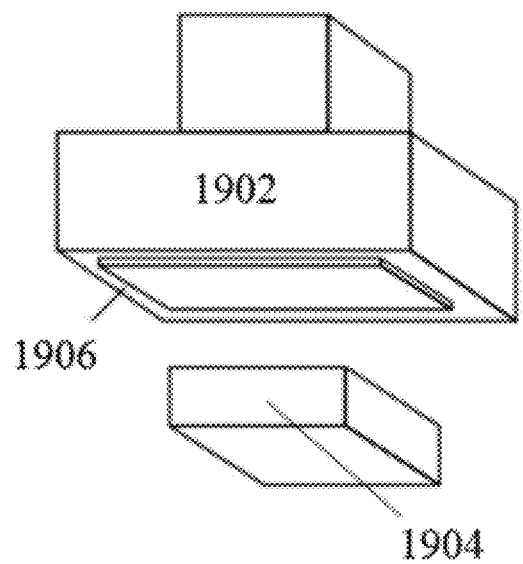
FIGS. 19A and 19B schematically illustrate grippers that use magnetic force to grasp an object.
Figure 19B:
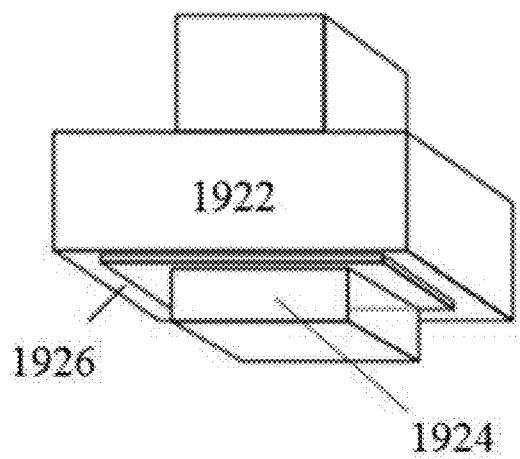

In another example, FIGS. 19A and 19B show grippers that can use magnetic force to grasp an object. In FIG. 19A, gripper 1902 comprises a magnetic field source that is configured to emit a magnetic field which can be switched on and off under control as desired to grasp or release object 1904. The strength of the magnetic field can be regulated by controlling the power to the magnetic field source. Sensing surface 1906 is conformal to the surface of gripper 1902 and can be used to detect properties of object 1904 or determine aspects of the instantaneous relationship between object 1904 and gripper 1902, for example to determine the quality of the attachment before lifting or moving object 1904. The sensing surface 1906 can have sensors disclosed elsewhere herein.

In FIG. 19B gripper 1922 comprises a magnetic field source that generates a magnetic field. Object 1924 can contain ferromagnetic material and the magnetic field attracts object 1924 to gripper 1922 with a force. Sensing surface 1926 is between gripper 1922 and object 1924. The sensing surface 1926 can have sensors disclosed elsewhere herein. In some cases, sensing surface 1926 is a sensing elastomer incorporating a plurality of electrically conductive points, and electrical properties are measured to determine instantaneous aspects of the force and orientation of object 1924 in respect to gripper 1922. Materials that are attracted by magnetic force are electrically conductive. For example, measurements using impedance and electrical impedance tomography (EIT) techniques can be employed.

Example 5

Figure 20:
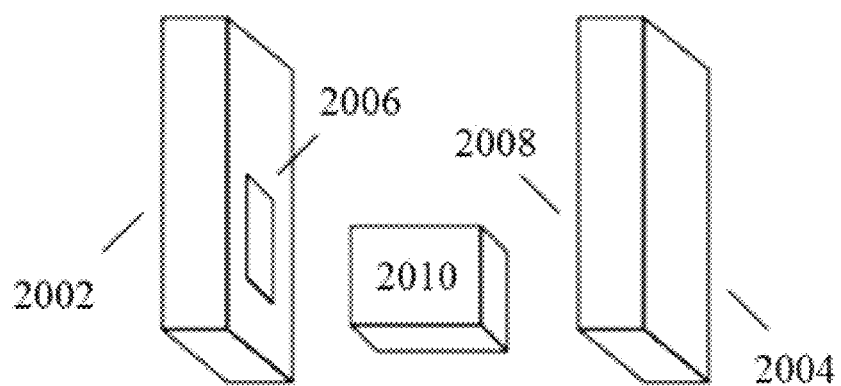
FIG. 20 schematically illustrates a robot gripping mechanism.

In another example, FIG. 20 shows a schematic representation of a robot gripping mechanism. The gripping mechanism can be used to characterize properties of an object by passing AC or DC electrical signals through the object. The gripping mechanism comprises two opposing fingers 2002 and 2004. Finger 2002 is configured with elastomeric sensing surface 2006, which may have features described elsewhere herein. Finger 2004 is configured with elastomeric sensing surface 2008, which may have features described elsewhere herein. In some embodiments, only one of the sensing surfaces 2006 and 2008 is used for measurement, while in other embodiments surfaces 2006 and 2008 are both active and used for measurement. In one embodiment gripper fingers 2002 and 2004 are closed by magnetic force, where the magnetic force can be controlled to open, close, or modulate the gripping force applied to object 2010.

Object 2010 may or may not be electrically conductive or ferromagnetic. In some cases, sensing surfaces 2006 and 2008 are used to apply electrical excitation to object 2010 to measure properties of object 2010 and determine the quality and properties of the grasp fingers 2002 and 2004 have with respect to object 2010. The surface of 2006 and 2008 may be textured with meso-scale structures or micro to nano-scale structures such as those used in fibrillar gripping mechanisms (e.g., gecko skin). As these structures are pressed against the object, the contact area between the sensor (2006, 2008) can increase and an increased amount of DC or AC current can pass though the object. Properties of the object can be inferred by inspecting the increased measured current passing by the sensor's electrodes.

For example, when object 2010 is electrically conductive, various measurement techniques discussed above can be applied. For example, conductivity in one, two or three dimensions can be measured. These measurements can use direct or alternating voltage or current as stimulus. When object 2010 is electrically non-conductive, a capacitive assembly is created where sensing pads 2006 and 2008 are the two sides of a capacitor including object 2010 as a dielectric material. In this case, an alternating voltage or current of known frequency is applied and the capacitance measurement yields information about object 2010 and the quality of the grasp.

Methods and systems of the present disclosure can be employed for use in various settings, such consumer and industrial settings. In some examples, methods, devices and systems of the present disclosure can be employed for use in healthcare (e.g., surgery), industrial settings (e.g., device manufacture). For instance, methods, devices and systems of the present disclosure can be employed for use in paper production and cardstock production.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for manipulating or sensing the presence of an object, comprising:
    at least one polymeric substrate including a plurality of non-metallic sensing electrodes, wherein said non-metallic sensing electrodes are flexible, and wherein said non-metallic sensing electrodes are adapted to sense changes in electrical impedance when disposed at or in proximity to said object; and
    a computer processor electrically coupled to said plurality of sensing electrodes and programmed to (i) measure signals indicative of a change in impedance of at least a subset of said non-metallic sensing electrodes, (ii) execute an electrical impedance tomography algorithm to determine, from said signals, one or more forces applied to said polymeric substrate, and (iii) based on said one or more forces, determine one or more characteristics indicative of a normal force or a change in normal force between said object and said polymeric substrate.

2. The system of claim 1, wherein said one or more characteristics are indicative of a presence of said object, shape of said object, and proximity of said object to said polymeric substrate.

3. The system of claim 1, wherein said polymeric substrate comprises a polymeric material and a fabric.

4. The system of claim 1, wherein said polymeric substrate comprises a first component volume and a second component volume, wherein said first component volume comprises said plurality of non-metallic sensing electrodes and said second component volume comprises a plurality of conductive pathways that are each in electrical contact with a non-metallic sensing electrode among said plurality of non-metallic sensing electrodes.

5. The system of claim 4, wherein said conductive pathways through the second component volume are metallic wires.

6. The system of claim 4, wherein said conductive pathways through said second component volume are a plurality of tunnels, wherein each tunnel is filled with a polymeric material.

7. The system of claim 1, wherein each of said plurality of non-metallic sensing electrodes comprises a pair of conductive pathways.

8. The system of claim 7, wherein said computer processor is programmed to apply an excitation voltage to said pair of conductive pathways.

9. The system of claim 8, wherein said computer processor is programmed to measure a voltage across said conductive pathways subsequent to applying said excitation voltage.

10. The system of claim 1, wherein said polymeric substrate has a hemispherical, cylindrical or box-like shape.

11. The system of claim 1, wherein said non-metallic sensing electrodes are formed of a polymeric material.

12. The system of claim 11, wherein said polymeric material has a higher electrical conductivity than said polymeric substrate.

13. The system of claim 1, wherein said non-metallic sensing electrodes comprise a carbon-containing material.

14. The system of claim 13, wherein said carbon-containing material is selected from the group consisting of carbon powder or carbon nanostructures.

15. The system of claim 1, wherein said non-metallic sensing electrodes comprise a foaming agent.

16. A paper production system comprising the system of claim 1.

17. The system of claim 1, wherein the polymeric substrate comprises two or more layers with different material properties.

18. The system of claim 17, wherein the two or more layers have different densities.

19. The system of claim 17, wherein the two or more layers have different conductivities.

20. The system of claim 17, wherein the two or more layers are stacked.

21. The system of claim 17, wherein one or more surfaces of the one or more layers is textured.

22. A system for manipulating or sensing the presence of an object, comprising:
- at least one polymeric substrate including a plurality of non-metallic sensing electrodes, wherein said non-metallic sensing electrodes are flexible, and wherein said non-metallic sensing electrodes are adapted to sense changes in electrical impedance when disposed at or in proximity to said object;
- a computer processor electrically coupled to said plurality of sensing electrodes and programmed to (i) measure signals indicative of a change in impedance of at least a subset of said non-metallic sensing electrodes, (ii) execute an electrical impedance tomography algorithm to determine, from said signals, one or more forces applied to said polymeric substrate, and (iii) based on said one or more forces, determine one or more characteristics of said object; and
- a manipulation member disposed adjacent to said polymeric substrate, wherein said manipulation member is configured to manipulate said object.

23. The system of claim 22, wherein said polymeric substrate is wrapped around said manipulation member.

24. The system of claim 22, wherein said manipulation member is a robotic gripper.

25. The system of claim 22, wherein said manipulation member is configured to apply a magnetic field to grip or grasp said object.

26. The system of claim 22, wherein said manipulation member is configured to apply an electrical current through said object to determine one or more properties of said object.

27. A method for manipulating or sensing the presence of an object, comprising:
- (a) providing a sensing system comprising at least one polymeric substrate, wherein said polymeric substrate comprises a plurality of non-metallic sensing electrodes that are flexible, and wherein said non-metallic sensing electrodes are adapted to sense changes in electrical impedance when disposed at or in proximity to said object;
- (b) measuring signals indicative of a change in impedance of at least a subset of said non-metallic sensing electrodes, wherein said signals are measured when said object is at or in proximity to said sensing system;
- (c) using a computer processor electrically coupled to said sensing system, executing an electrical impedance tomography algorithm to determine, from said signals measured in (b), one or more forces applied to said polymeric substrate; and
- (d) based on said one or more forces determined in (c), determining one or more characteristics indicative of a normal force or a change in normal force between said object and said polymeric substrate.

28. The method of claim 27, wherein said one or more characteristics are indicative of a presence of said object, shape of said object, and proximity of said object to said polymeric substrate.

29. The method of claim 27, further comprising applying an excitation voltage to a subset of said non-metallic sensing electrodes.

30. The method of claim 29, further comprising measuring a voltage across said subset subsequent to applying said excitation voltage.

31. A method for manipulating or sensing the presence of an object, comprising:
- (a) providing a sensing system comprising at least one polymeric substrate, wherein said polymeric substrate comprises a plurality of non-metallic sensing electrodes that are flexible, and wherein said non-metallic sensing electrodes are adapted to sense changes in electrical impedance when disposed at or in proximity to said object;
- (b) measuring signals indicative of a change in impedance of at least a subset of said non-metallic sensing electrodes, wherein said signals are measured when said object is at or in proximity to said sensing system;
- (c) using a computer processor electrically coupled to said sensing system, executing an electrical impedance tomography algorithm to determine, from said signals measured in (b), one or more forces applied to said polymeric substrate;
- (d) based on said one or more forces determined in (c), determining one or more characteristics of said object; and
- (e) subsequent to (d), manipulating said object using a manipulation member, wherein said manipulation member is part of or electrically coupled to said sensing system.

32. A method for sensing or manipulating an object, comprising:
- (a) providing a manipulation system comprising a manipulation member and a motion input sensing device, wherein said manipulation member comprises at least one sensor with sensing electrodes that measure changes in impedance when an object is situated at or in proximity to said sensing electrodes, and wherein said motion input sensing device determines the spatial configuration of said object;

(b) bringing said object at or in proximity to said manipulation system;

(c) using said motion input sensing device, collecting a first set of data from said object, wherein said first set of data is indicative of the spatial configuration of said object;

(d) using said sensing electrodes of said sensor, collecting a second set of data under boundary conditions determined from said first set of data, wherein said second set of data is indicative of impedance changes; and (e) using said manipulation member, manipulating said object if, based on said impedance changes, said object is determined to be at or in proximity to said sensor.

33. The method of claim 32, wherein said boundary conditions are determined from one or boundaries of said object from said first set of data.

34. The method of claim 32, wherein said first set of data has a lower spatial resolution than said first set of data.

35. The method of claim 32, further comprising, prior to (d), determining one or more characteristics of said object from said first set of data.

36. The method of claim 35, further comprising, subsequent to (d), refining said one or more characteristics of said object based on said second set of data.

37. The method of claim 32, further comprising combining said first set of data and said second set of data.

38. The method of claim 37, further comprising, subsequent to (d), fitting said combined data to one or more predetermined objects having known characteristics.

39. The method of claim 38, further comprising determining a pose estimate subsequent to said fitting.

* * * * *